(12) United States Patent
Shaw et al.

(10) Patent No.: US 9,152,249 B2
(45) Date of Patent: *Oct. 6, 2015

(54) SYSTEM AND METHOD FOR DETERMINING AN ATTITUDE OF A DEVICE UNDERGOING DYNAMIC ACCELERATION

(71) Applicant: Sensor Platforms, Inc., Mountain View, CA (US)

(72) Inventors: Kevin A. Shaw, Millbrae, CA (US); Ian Chen, Campbell, CA (US)

(73) Assignee: Sensor Platforms, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/069,318

(22) Filed: Oct. 31, 2013

(65) Prior Publication Data
US 2014/0139432 A1    May 22, 2014

Related U.S. Application Data

(63) Continuation of application No. 12/338,991, filed on Dec. 18, 2008, now Pat. No. 8,576,169.

(60) Provisional application No. 61/106,915, filed on Oct. 20, 2008.

(51) Int. Cl.
G06F 3/033    (2013.01)
G06F 3/0346   (2013.01)
G06F 3/01     (2006.01)

(52) U.S. Cl.
CPC .............. *G06F 3/0346* (2013.01); *G06F 3/017* (2013.01)

(58) Field of Classification Search
USPC .................................................. 345/158, 157
See application file for complete search history.

(56) References Cited

U.S. PATENT DOCUMENTS 3,953,795 A    4/1976   Brunner et al.
4,263,494 A    4/1981   Martin
(Continued)

FOREIGN PATENT DOCUMENTS

EP    1762287 A2    3/2007
EP    2120134       11/2009
(Continued)

OTHER PUBLICATIONS

Ang, Kalman filtering for real-time orientation tracking of handheld microsurgical instrument, Sep. 28-Oct. 2, 2004, 8 pgs.
(Continued)

*Primary Examiner* — Fred Tzeng
(74) *Attorney, Agent, or Firm* — Carr & Ferrell LLP

(57) ABSTRACT

A system and a method for determining an attitude of a device undergoing dynamic acceleration is presented. A first attitude measurement is calculated based on a magnetic field measurement received from a magnetometer of the device and a first acceleration measurement received from a first accelerometer of the device. A second attitude measurement is calculated based on the magnetic field measurement received from the magnetometer of the device and a second acceleration measurement received from a second accelerometer of the device. A correction factor is calculated based at least in part on a difference of the first attitude measurement and the second attitude measurement. The correction factor is then applied to the first attitude measurement to produce a corrected attitude measurement for the device.

20 Claims, 12 Drawing Sheets

(56) References Cited

U.S. PATENT DOCUMENTS

| | | |
|---|---|---|
| 4,318,186 A | 3/1982 | Wynn |
| 4,467,272 A | 8/1984 | Hassler et al. |
| 4,516,770 A | 5/1985 | Brookes et al. |
| 4,641,246 A | 2/1987 | Halbert et al. |
| 4,816,748 A | 3/1989 | Tazawa et al. |
| 4,847,783 A | 7/1989 | Grace et al. |
| 5,128,671 A | 7/1992 | Thomas, Jr. |
| 5,239,264 A | 8/1993 | Hawks |
| 5,321,401 A | 6/1994 | White |
| 5,637,994 A | 6/1997 | Carder |
| 5,645,077 A | 7/1997 | Foxlin |
| 5,757,360 A | 5/1998 | Nitta et al. |
| 5,819,206 A | 10/1998 | Horton et al. |
| 5,874,941 A | 2/1999 | Yamada |
| 5,893,049 A | 4/1999 | Reggiardo |
| 6,072,467 A | 6/2000 | Walker |
| 6,157,894 A | 12/2000 | Hess et al. |
| 6,176,837 B1 | 1/2001 | Foxlin |
| 6,304,828 B1 | 10/2001 | Swanick et al. |
| 6,384,596 B1 | 5/2002 | Beyer |
| 6,882,086 B2 | 4/2005 | Kornbluh et al. |
| 7,139,983 B2 | 11/2006 | Kelts |
| 7,158,118 B2 | 1/2007 | Liberty |
| 7,216,055 B1 | 5/2007 | Horton et al. |
| 7,262,760 B2 | 8/2007 | Liberty |
| 7,285,964 B1 | 10/2007 | Hsu et al. |
| 7,296,363 B2 | 11/2007 | Danisch et al. |
| 7,305,630 B2 | 12/2007 | Hullender et al. |
| 7,307,411 B1 | 12/2007 | Hsu et al. |
| 7,350,303 B2 | 4/2008 | Rock et al. |
| 7,414,611 B2 | 8/2008 | Liberty |
| 7,451,549 B1 | 11/2008 | Sodhi et al. |
| 7,647,185 B2 | 1/2010 | Tarassenko et al. |
| 7,815,508 B2 | 10/2010 | Dohta |
| 7,844,415 B1 | 11/2010 | Bryant et al. |
| 7,940,986 B2 | 5/2011 | Mekenkamp et al. |
| 7,978,178 B2 | 7/2011 | Pehlivan et al. |
| 8,184,100 B2 | 5/2012 | Lian et al. |
| 8,201,200 B2 | 6/2012 | Imai |
| 8,223,121 B2 | 7/2012 | Shaw et al. |
| 8,515,707 B2 | 8/2013 | Joseph et al. |
| 8,576,169 B2 | 11/2013 | Shaw et al. |
| 8,587,519 B2 | 11/2013 | Shaw et al. |
| 8,907,893 B2 | 12/2014 | Shaw et al. |
| 8,957,909 B2 | 2/2015 | Joseph et al. |
| 2002/0120217 A1 | 8/2002 | Adapathya et al. |
| 2002/0158815 A1 | 10/2002 | Zwern |
| 2002/0169553 A1 | 11/2002 | Perlmutter et al. |
| 2003/0018430 A1 | 1/2003 | Ladetto et al. |
| 2003/0023192 A1 | 1/2003 | Foxlin |
| 2003/0107888 A1 | 6/2003 | Devlin et al. |
| 2003/0149907 A1 | 8/2003 | Singh et al. |
| 2003/0164739 A1 | 9/2003 | Bae |
| 2004/0198463 A1 | 10/2004 | Knoedgen |
| 2004/0199674 A1 | 10/2004 | Brinkhus |
| 2005/0229117 A1 | 10/2005 | Hullender et al. |
| 2006/0033716 A1 | 2/2006 | Rosenberg et al. |
| 2006/0164384 A1 | 7/2006 | Smith et al. |
| 2006/0164386 A1 | 7/2006 | Smith et al. |
| 2006/0195254 A1 | 8/2006 | Ladetto et al. |
| 2006/0250358 A1 | 11/2006 | Wroblewski |
| 2007/0146319 A1 | 6/2007 | Masselle et al. |
| 2007/0234779 A1 | 10/2007 | Hsu et al. |
| 2007/0287911 A1 | 12/2007 | Haid et al. |
| 2008/0072234 A1 | 3/2008 | Myroup |
| 2008/0080789 A1 | 4/2008 | Marks et al. |
| 2008/0150891 A1 | 6/2008 | Berkley et al. |
| 2008/0211768 A1 | 9/2008 | Breen et al. |
| 2008/0281555 A1 | 11/2008 | Godin et al. |
| 2008/0284729 A1 | 11/2008 | Kurtenbach et al. |
| 2009/0009471 A1 | 1/2009 | Yamamoto et al. |
| 2009/0040175 A1 | 2/2009 | Xu et al. |
| 2009/0048021 A1 | 2/2009 | Lian et al. |
| 2009/0153349 A1 | 6/2009 | Lin et al. |
| 2009/0295722 A1 | 12/2009 | Yamamoto |
| 2009/0326857 A1 | 12/2009 | Mathews et al. |
| 2010/0039381 A1 | 2/2010 | Cretella et al. |
| 2010/0060573 A1 | 3/2010 | Moussavi |
| 2010/0088061 A1 | 4/2010 | Horodezky et al. |
| 2010/0095773 A1 | 4/2010 | Shaw et al. |
| 2010/0097316 A1 | 4/2010 | Shaw et al. |
| 2010/0110001 A1 | 5/2010 | Yamamoto |
| 2010/0123605 A1 | 5/2010 | Wilson |
| 2010/0123656 A1 | 5/2010 | Park et al. |
| 2010/0149341 A1 | 6/2010 | Marks et al. |
| 2010/0150404 A1 | 6/2010 | Marks et al. |
| 2010/0156786 A1 | 6/2010 | Kabasawa et al. |
| 2010/0157168 A1 | 6/2010 | Dunton et al. |
| 2010/0174506 A1 | 7/2010 | Joseph et al. |
| 2010/0194879 A1 | 8/2010 | Pasveer et al. |
| 2010/0302145 A1 | 12/2010 | Langridge et al. |
| 2011/0163947 A1 | 7/2011 | Shaw et al. |
| 2011/0205156 A1 | 8/2011 | Gomez et al. |
| 2011/0239026 A1 | 9/2011 | Kulik |
| 2011/0241656 A1 | 10/2011 | Piemonte et al. |
| 2011/0242361 A1 | 10/2011 | Kuwahara et al. |
| 2012/0007713 A1 | 1/2012 | Nasiri et al. |
| 2012/0086725 A1 | 4/2012 | Joseph et al. |
| 2013/0174636 A1 | 7/2013 | Joseph |
| 2013/0179108 A1 | 7/2013 | Joseph et al. |
| 2013/0253821 A1 | 9/2013 | Joseph et al. |
| 2014/0055351 A1 | 2/2014 | Shaw et al. |

FOREIGN PATENT DOCUMENTS

| | | |
|---|---|---|
| EP | 2485119 | 8/2012 |
| EP | 2579127 | 4/2013 |
| WO | WO 2004/047011 A2 | 6/2004 |
| WO | WO 2005/040991 A2 | 5/2005 |
| WO | WO 2005/108119 A2 | 11/2005 |
| WO | WO2006054295 | 5/2006 |
| WO | WO 2006/090197 A1 | 8/2006 |
| WO | WO 2009/093161 A1 | 7/2009 |
| WO | WO 2009/132920 A1 | 11/2009 |
| WO | WO 2009/156499 A1 | 12/2009 |
| WO | WO2010048000 | 4/2010 |
| WO | WO2010080383 | 7/2010 |
| WO | WO2011085017 | 7/2011 |
| WO | WO2011109229 | 9/2011 |
| WO | WO2012047494 | 4/2012 |
| WO | WO2013104006 | 7/2013 |
| WO | WO2013148585 | 10/2013 |

OTHER PUBLICATIONS

Foxlin, "Intertial Head-Tracker Sensor Fusion by a Complementary Separate-Bias Kalman Filter,"1996, IEEE, pp. 185-195.

Foxlin et al., "Miniature 6-DOF Inertial System for Tracking HMDs," SPIE vol. 3362, Helmet and Head-Mounted Displays III, AeroSense 98, Orlando, Fl, Apr. 13-14, 1998, pp. 1-15.

Sensor Platforms, ISR/WO, PCT/US2009/060475, May 18, 2010, 9 pgs.

Sensor Platforms, ISR/WO, PCT/US2009/067976, May 3, 2010, 9 pgs.

Sensor Platforms, ISR/WO, PCT/US2011/020242, Apr. 12, 2011, 13 pgs.

Sensor Platforms, ISR/WO, PCT/US2011/052185, Jan. 31, 2012, 11 pgs.

Sensor Platforms, ISR/WO, PCT/US2012/020365, May 23, 2012 10 pgs.

Simon, Kalman Filtering, Embedded Systems Programming, Jun. 2001, pp. 72-79.

International Search Report and Written Opinion mailed Jul. 29, 2013 for International Application No. PCT/US2013/033723.

Sedlak, Joseph E. "Spinning Spacecraft Attitude Estimation Using Markley Variables: Filter Implementation and Results" NASA Goddard Space Flight Center CP-2005-212789, Greenbelt, MD (2005).

Luong-Van, D. et al. "Covariance Profiling for an Adaptive Kalman Filter to Suppress Sensor Quantization Effects" 43rd IEEE Conference on Decision and Control, vol. 3, pp. 2680-2685, Dec. 14-17, 2004.

(56) References Cited

OTHER PUBLICATIONS

Girod et al., "The Design and Implementation of a Self-Calibrating Distributed Acoustic Sensing Platform", SenSys '06, Nov. 1-3, 2006.

Kim et al., "Modeling and Calibration of a Multi-Spectral Imaging Sensor for In-Field Crop Nitrogen Assessment", Applied Engineering in Agriculture, vol. 22(6): pp. 935-941.

Ramanathan et al., "Rapid Deployment with Confidence: Calibration and Fault Detection in Environmental Sensor Networks", Center for Embedded Networked Sensing, UCLA, Department of Civil and Environmental Engineering, MIT, Jul. 4, 2006, pp. 1-14.

Bychkovskiy, Vladimir Leonidovich, "Distributed In-Place Calibration in Sensor Networks," 2003, 42 pages.

Sedlak et al., "Automated Attitude Sensor Calibration: Progress and Plans", AIAA/AAS Astrodynamics Specialist Conference, Providence, RI, Aug. 2004.

SYSTEM AND METHOD FOR DETERMINING AN ATTITUDE OF A DEVICE UNDERGOING DYNAMIC ACCELERATION

RELATED APPLICATIONS

This application is a continuation of U.S. application Ser. No. 12/338,991, filed Dec. 18, 2008, now U.S. Pat. No. 8,576, 169, issued Nov. 5, 2013, which claims priority under 35 U.S.C. §119 to U.S. Provisional Patent Application No. 61/106,915 filed Oct. 20, 2008, which applications are incorporated by reference herein in their entirety.

This application is related to U.S. patent application Ser. No. 12/338,996, filed Dec. 18, 2008, "Host System and Method for Determining an Attitude of a Device Undergoing Dynamic Acceleration," which application is incorporated by reference herein in its entirety.

TECHNICAL FIELD

The disclosed embodiments relate generally to determining an attitude of a device undergoing dynamic acceleration.

BACKGROUND

A pointing device (e.g., a mouse, a trackball, etc.) may be used to interact with objects within a user interface of a computer system or other electronic devices (e.g., a set top box, etc.). Some applications may need to know the heading of a pointing device while the device is moving. One such example is an application that interfaces with a multi-dimensional pointing device, which is a device that may be freely moved in space (e.g., in one, two, or three dimensions) to position a cursor in a user interface of a computer system or other electronic devices. The act of moving the multi-dimensional pointing device around creates accelerations and decelerations that may cause conventional attitude-determination techniques (e.g., the TRIAD technique) to fail.

A technique that uses a combination of gyroscopes and accelerometers may be used to determine the attitude of a multi-dimensional pointing device while the device is moving. Similarly, a technique that uses a combination of light sources and cameras may be used. Unfortunately, these techniques add to the cost of the device.

Accordingly, it would be highly desirable to provide a multi-dimensional pointing device that addresses the above described drawbacks.

SUMMARY

Some embodiments provide a method, a computer readable storage medium including instructions, and a system for determining an attitude of a device undergoing dynamic acceleration. A first attitude measurement is calculated based on a magnetic field measurement received from a magnetometer of the device and a first acceleration measurement received from a first accelerometer of the device. A second attitude measurement is calculated based on the magnetic field measurement received from the magnetometer of the device and a second acceleration measurement received from a second accelerometer of the device. A correction factor is calculated based at least in part on a difference of the first attitude measurement and the second attitude measurement. The correction factor is then applied to the first attitude measurement to produce a corrected attitude measurement for the device. In some embodiments, the aforementioned operations (or a subset thereof) are performed on a host system. In some embodiments, the aforementioned operations (or a subset thereof) are performed by the device.

In some embodiments, the device includes a multi-dimensional pointing device.

In some embodiments, the correction factor includes a scaling factor that is based at least in part on a distance from the first accelerometer and a pivot origin, and a distance from the second accelerometer and the pivot origin.

In some embodiments, the corrected attitude measurement is transmitted from the device to a host system.

In some embodiments, signals are transmitted from the device to a host system indicating that one or more buttons on the device have been pressed.

In some embodiments, signals are transmitted from the device to a host system indicating that a user of the device has performed one or more gestures.

In some embodiments, the magnetic field measurement, the first acceleration measurement, and the second acceleration measurement are transmitted from the device to a host system.

In some embodiments, the magnetic field measurement, the first acceleration measurement, and the second acceleration measurement are received at a host system from the device.

In some embodiments, signals are received at a host system from the device indicating that one or more buttons of the device have been pressed.

In some embodiments, the first attitude measurement and the second attitude measurement are performed substantially simultaneously.

In some embodiments, the corrected attitude measurement is used to position a cursor displayed on a user interface of a host system.

In some embodiments, a gesture that is being performed by a user of the device is determined.

In some embodiments, the gesture includes a sequence of changes in attitude of the device over a contiguous period of time.

In some embodiments, the gesture includes a combination of a sequence of changes in attitude of the device and one or more buttons being pressed on the device over a contiguous period of time.

In some embodiments, the gesture corresponds to a command to the host system. The determination of the gesture is based on one or more positions of the cursor in the user interface selected from the group consisting of a beginning position of the gesture occurring with the cursor positioned within a first predefined proximity of an object in the user interface, an end of the gesture occurring with the cursor positioned with a second predefined proximity of the object in the user interface, or both the beginning and end of the gesture occurring with the cursor positioned within the first and second proximities of the object, respectively.

In some embodiments, the first accelerometer is selected from the group consisting of: a 2-axis accelerometer that measures a magnitude and a direction of an acceleration force in two dimensions, and a 3-axis accelerometer that measures a magnitude and a direction of an acceleration force in three dimensions.

In some embodiments, the second accelerometer is selected from the group consisting of: a 2-axis accelerometer that measures a magnitude and a direction of an acceleration force in two dimensions, and a 3-axis accelerometer that measures a magnitude and a direction of an acceleration force in three dimensions.

In some embodiments, the magnetometer is selected from the group consisting of: a 2-axis magnetometer that measures a magnitude and a direction of a magnetic field in two dimensions, and a 3-axis magnetometer that measures a magnitude and a direction of a magnetic field in three dimensions.

Some embodiments provide a method, a computer readable storage medium including instructions, and a system for determining an attitude of a device undergoing dynamic acceleration. A first multi-dimensional acceleration measurement is received from a first accelerometer of the device. A second multi-dimensional acceleration measurement is received from a second accelerometer of the device, wherein the device includes two or more multi-dimensional accelerometers including at least the first accelerometer and the second accelerometer. The attitude of the device is calculated based on the first and the second acceleration measurements. In some embodiments, the aforementioned operations (or a subset thereof) are performed on a host system. In some embodiments, the aforementioned operations (or a subset thereof) are performed by the device. In some embodiments, the aforementioned operations are performed during dynamic acceleration of the device. In some embodiments, a correction factor that substantially corrects for attitude determination errors caused by (or more generally, associated with) the dynamic acceleration is determined.

Some embodiments provide a method, a computer readable storage medium including instructions, and a system for determining an attitude of a device undergoing dynamic acceleration. A first multi-dimensional acceleration measurement is received from a first accelerometer of the device. A second multi-dimensional acceleration measurement is received from a second accelerometer of the device, wherein the device includes two or more multi-dimensional accelerometers including at least the first accelerometer and the second accelerometer. A first magnetic field measurement is received from a first magnetometer, wherein the device includes one or more magnetometers including at least the first magnetometer. The attitude of the device is then calculated based on the first and the second accelerometer measurements and the first magnetometer measurement. In some embodiments, the aforementioned operations (or a subset thereof) are performed on a host system. In some embodiments, the aforementioned operations (or a subset thereof) are performed by the device. In some embodiments, the aforementioned operations are performed during dynamic acceleration of the device.

In some embodiments, a correction factor that substantially corrects for attitude determination errors caused by (or more generally, associated with) the dynamic acceleration is determined.

In some embodiments, the correction factor is based on at least the first and the second acceleration measurements.

In some embodiments, the correction factor is based on at least the separation between the first and the second accelerometers.

BRIEF DESCRIPTION OF THE DRAWINGS

Like reference numerals refer to corresponding parts throughout the drawings.

DESCRIPTION OF EMBODIMENTS

Digital Convergence

Before discussing embodiments that can be used to solve the aforementioned problems, it is instructive to discuss the possible uses of the embodiments described herein. The idea of "digital convergence" has been a prevalent pursuit for many years. One aspect of "digital convergence" is making content (e.g., digital content) available to a user on any type of display device. The struggle towards digital convergence is particularly acute among personal computer (PC) manufacturers, broadband media providers, and consumer electronics (CE) manufacturers.

CE manufacturers and broadband media providers have experienced the effects of the rise of Internet-distributed content (e.g., digital movie and music downloads, etc.), which have diverted consumers from their products and services. Accordingly, consumers spend more time in front of their personal computers (PCs). Digital convergence may allow CE manufacturers and broadband media providers to recapture consumer attention by routing content consumption through their domains (e.g., cable and satellite transmissions to a television set).

Unfortunately, one substantial hurdle to digital convergence is the lack of an advanced user interface for the television set (or other CE devices). Although high-definition television (HDTV) has increased the resolution of the television programs displayed, the remote control of a television set or a cable/satellite set-top box (STB) remains archaic: including a numeric keypad, up/down/left/right arrows, and a large number of predefined function keys. This lack of an advanced user interface makes the PC a logical venue for interactive content.

Digital convergence may redefine the role of the television set. Instead of just providing multimedia content for passive consumption, the television set may be a center of interactivity, providing access to photos, movies, music, games, phone calls, video conferences, etc. However, to facilitate the goal of digital convergence, an advanced user interface must be provided for the television set. Accordingly, the simple remote controller for existing television sets must be replaced with a device that can interact with the advanced user interface. Furthermore, the remote controller must remain cost-effective (e.g., less than $10), must have long battery life, and must be responsive to user input.

Multi-Dimensional Pointing Device

Figure 1:
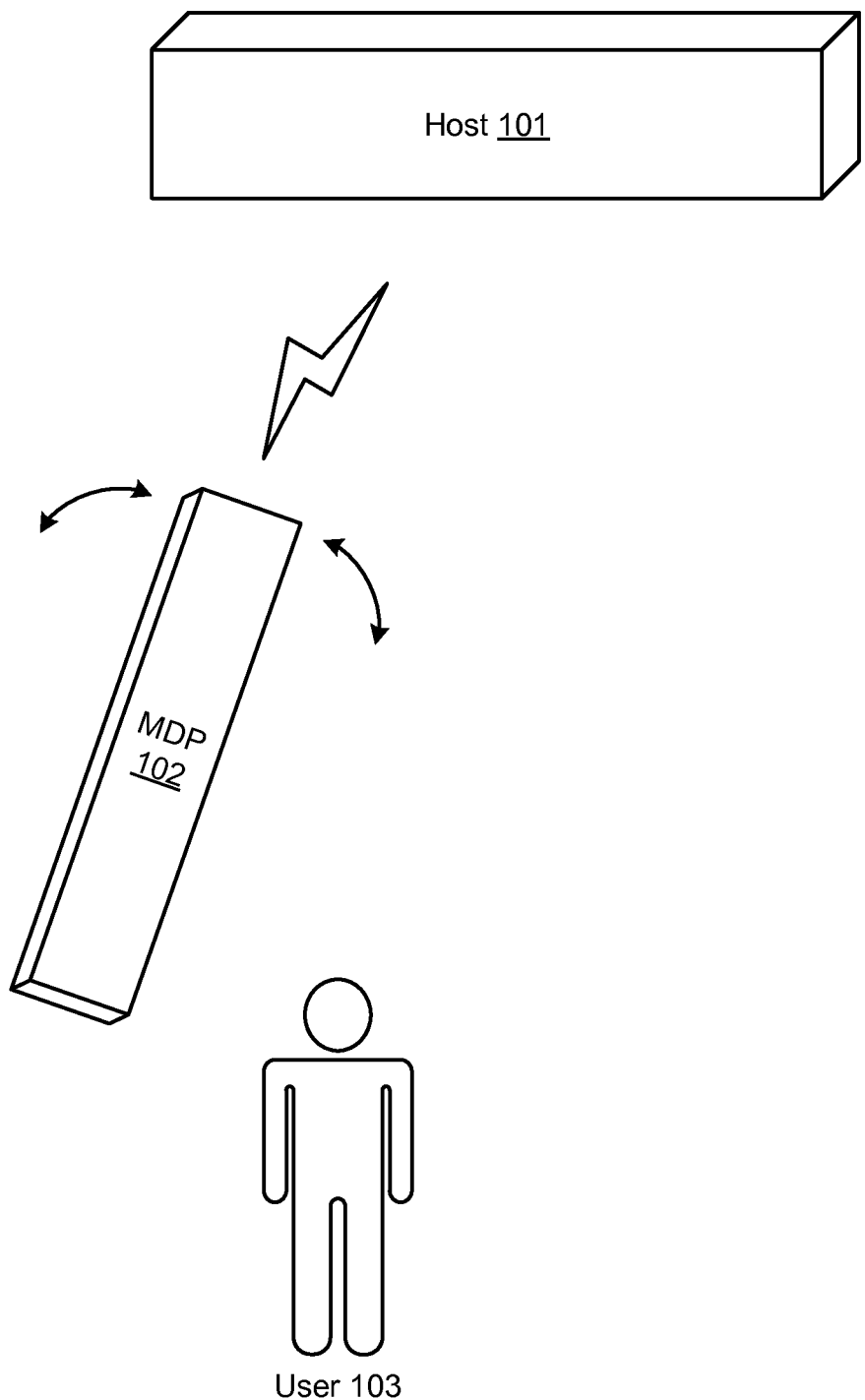
FIG. 1 illustrates an exemplary multi-dimensional pointing device coupled to an exemplary host system through a wireless interface, according to some embodiments.

A multi-dimensional pointing device may be used to interact with advanced user interfaces that are needed to achieve digital convergence. FIG. 1 illustrates an exemplary multi-dimensional pointing (MDP) device 102 coupled to an exemplary host system 101 through a wireless interface, according to some embodiments. In these embodiments, a user 103 can use the multi-dimensional pointing device 102 to issue commands to the host system 101, control objects in the user interface of the host system 101, and/or position objects in the user interface of the host system 101. In some embodiments, the multi-dimensional pointing device 102 is sensitive to six degrees of freedom: x, y, z, yaw, pitch, and roll.

In some embodiments, the wireless interface is selected from the group consisting of: a Wi-Fi interface, a Bluetooth interface, an infrared interface, an audio interface, a visible light interface, a radio frequency (RF) interface, and any combination of the aforementioned wireless interfaces.

In some embodiments, data (e.g., raw measurements, calculated attitude, correction factors, position information, etc.) from the multi-dimensional pointing device 102 is received and processed by a host side device driver on the host system 101. The host system 101 can then use this data to position cursors, objects, etc., in the user interface of the host system 101.

In some embodiments, the wireless interface is a unidirectional wireless interface from the multi-dimensional pointing device to the host system 101. In some embodiments, the wireless interface is a bidirectional wireless interface. In some embodiments, bidirectional communication is used to perform handshaking and pairing operations.

In some embodiments, a wired interface can be used instead of a wireless interface. As with the wireless interface, the wired interface may be a unidirectional or bidirectional wired interface.

As mentioned above, the act of moving a multi-dimensional pointer around creates accelerations and decelerations that may cause conventional attitude-determination techniques to fail. Specifically, consider a device that includes a single multi-dimensional magnetometer (e.g., a tri-axial magnetometer) and a single multi-dimensional accelerometer (e.g., a tri-axial accelerometer), which is subject to dynamic acceleration. Note that the term "dynamic acceleration" refers to acceleration and/or deceleration (e.g., accelerations/decelerations during movement of the device). Applying the TRIAD technique to magnetic field measurements from a single multi-dimensional magnetometer and acceleration measurements from a single multi-dimensional accelerometer results in attitude measurements that include errors. The errors arise because the TRIAD technique depends on a constant relationship between the Earth's magnetic field and gravity. Consequently, the TRIAD technique only produces correct attitude measurements when the device is not undergoing dynamic acceleration (e.g., at rest or at constant velocity). If the device is being accelerated, the acceleration measurement includes a combination of gravity and the acceleration imparted by movements of the device. Using this acceleration measurement to represent the Earth's gravity produces substantial errors in the computed attitude. These problems are described in more detail with respect to FIGS. 5-7 below.

One solution is to use a multi-dimensional pointing device that includes a gyroscope (e.g., a MEMS gyroscope). However, the physics of the gyroscopes can cause artifacts. For example, these types of multi-dimensional pointing devices can drift when the device is held in a stationary position. Furthermore, these multi-dimensional pointing devices can require substantial force before the device produces a reaction in the user interface.

Thus, to solve the aforementioned problems, some embodiments use magnetic field measurements from one or more multi-dimensional magnetometers and acceleration measurements from two or more multi-dimensional accelerometers that are included in a multi-dimensional pointing device to calculate the attitude of the device. In these embodiments, the calculated attitude of the device is compensated for errors that would otherwise be caused by dynamic acceleration. In some embodiments, the multi-dimensional accelerometers are placed a specified distance apart in a rigid frame (e.g., a printed circuit board on the device). When the device is rotated, the multi-dimensional accelerometers experience different accelerations due to their different radiuses of rotation. Note that when the frame is moved in translation (e.g., without rotation), all the accelerometers experience the same acceleration. It is then possible to use the differences in the accelerometer readings to distinguish between user movement (e.g., dynamic acceleration) and the acceleration caused by Earth's gravity to correctly estimate the attitude of the device.

Figure 2:
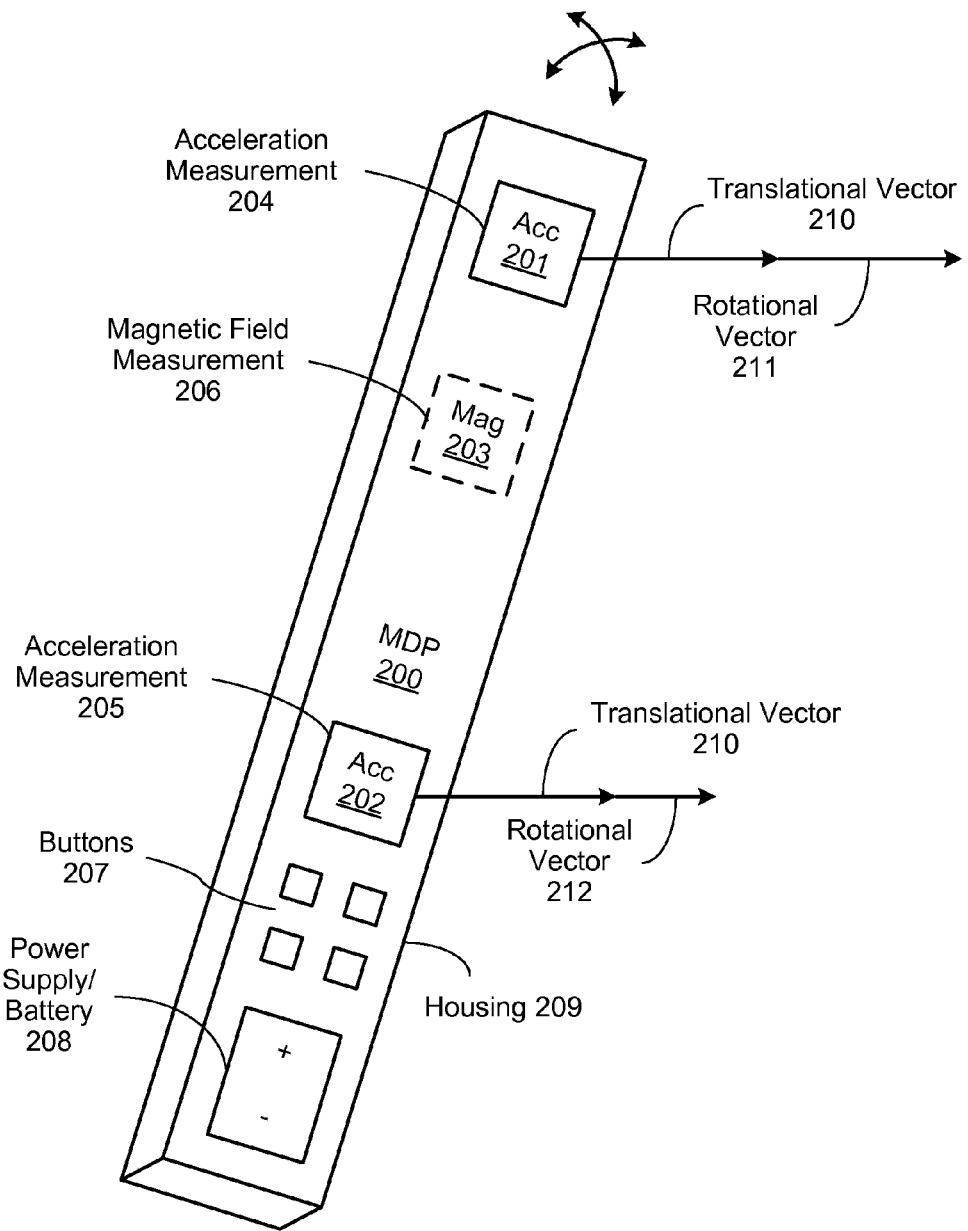
FIG. 2 is a block diagram illustrating an exemplary multi-dimensional pointing device, according to some embodiments.

FIG. 2 is a block diagram illustrating an exemplary multi-dimensional pointing device 200, according to some embodiments. The multi-dimensional pointing (MDP) device 200 may be the multi-dimensional pointing device 102 in FIG. 1. The multi-dimensional pointing device 200 includes two or more multi-dimensional accelerometers 201-202 that produce composite acceleration measurements 204-205 (e.g., a composite/vector sum of translational acceleration vector 210, rotational acceleration vector 211-212, and acceleration due to Earth's gravity), one or more multi-dimensional magnetometers 203 that produce magnetic field measurements 206 (e.g., the Earth's magnetic field), buttons 207, and a power supply and/or battery 208. In some embodiments, the two or more multi-dimensional accelerometers 201-202 that produce acceleration measurements 204-205, one or more multi-dimensional magnetometers 203 that produce magnetic field measurements 206, buttons 207, and the power supply or battery 208 are all enclosed in a housing 209 of the multi-dimensional pointing device 200.

In some embodiments, the two or more multi-dimensional accelerometers 201-202 are selected from the group consisting of: a 2-axis accelerometer that measures a magnitude and a direction of an acceleration force in two dimensions and a 3-axis accelerometer that measures a magnitude and a direction of an acceleration force in three dimensions.

In some embodiments, the one or more multi-dimensional magnetometers 203 are selected from the group consisting of: a 2-axis magnetometer that measures a magnitude and a direction of a magnetic field in two dimensions and a 3-axis magnetometer that measures a magnitude and a direction of a magnetic field in three dimensions.

In some embodiments, the multi-dimensional pointing device 200 also includes one or more of the following additional user interface components: a keypad, one or more thumb wheels, one or more light-emitting diodes (LEDs), a audio speaker, an audio microphone, a liquid crystal display (LCD), etc.

Figure 11:
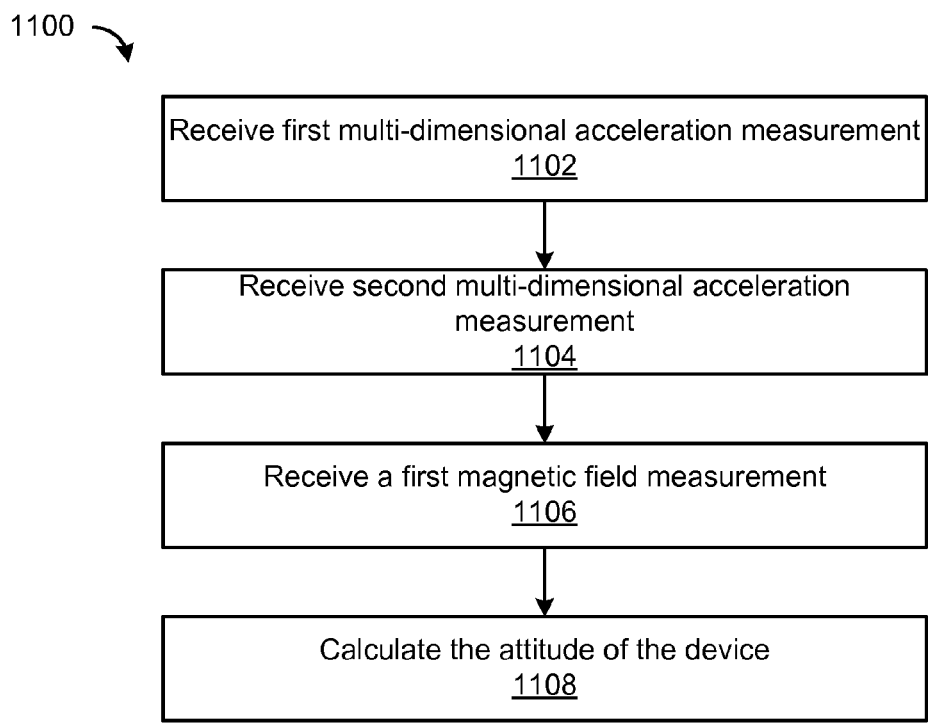
FIG. 11 is a flow diagram of another method for determining an attitude of a device undergoing dynamic acceleration, according to some embodiments.
Figure 12:
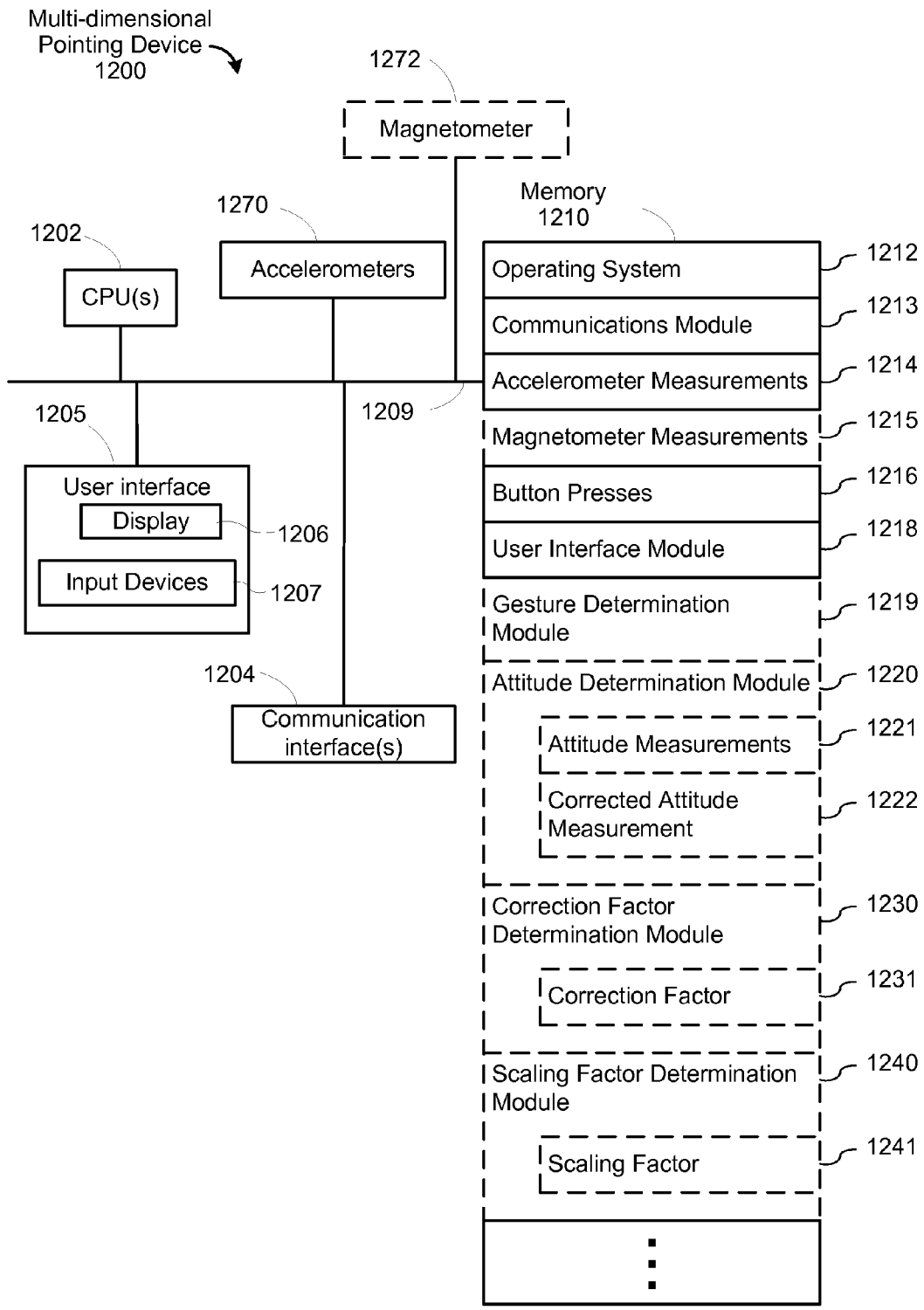
FIG. 12 presents a block diagram of an exemplary multi-dimensional pointing device, according to some embodiments.

In some embodiments, the multi-dimensional pointing device 200 includes one or more processors (e.g., 1202, FIG. 12). In these embodiments, the one or more processors process the acceleration measurements received from the multi-dimensional accelerometers 201-202 and/or magnetic field measurements received from the multi-dimensional magnetometer 203 to determine displacements (e.g., lateral displacements and/or attitude changes) of the multi-dimensional pointing device 200. These calculations are described in more detail with respect to FIGS. 10-13 below.

In some embodiments, the one or more processors of the multi-dimensional pointing device 200 perform one or more of the following operations: sampling measurement values, at a respective sampling rate, produced by each of the multi-dimensional accelerometers 201-202 and the multi-dimensional magnetometers 203; processing sampled data to determine displacement; transmitting displacement information to the host system 101; monitoring the battery voltage and alerting the host system 101 when the charge of the battery is low; monitoring other user input devices (e.g., keypads, buttons, etc.), if any, on the multi-dimensional pointing device 200; continuously or periodically run background processes to maintain or update calibration of the multi-dimensional accelerometers 201-202 and the multi-dimensional magnetometers 203; provide feedback to the user as needed on the remote (e.g., via LEDs, etc.); and recognizing gestures performed by user movement of the multi-dimensional pointing device 200.

Software Architecture

Figure 3:
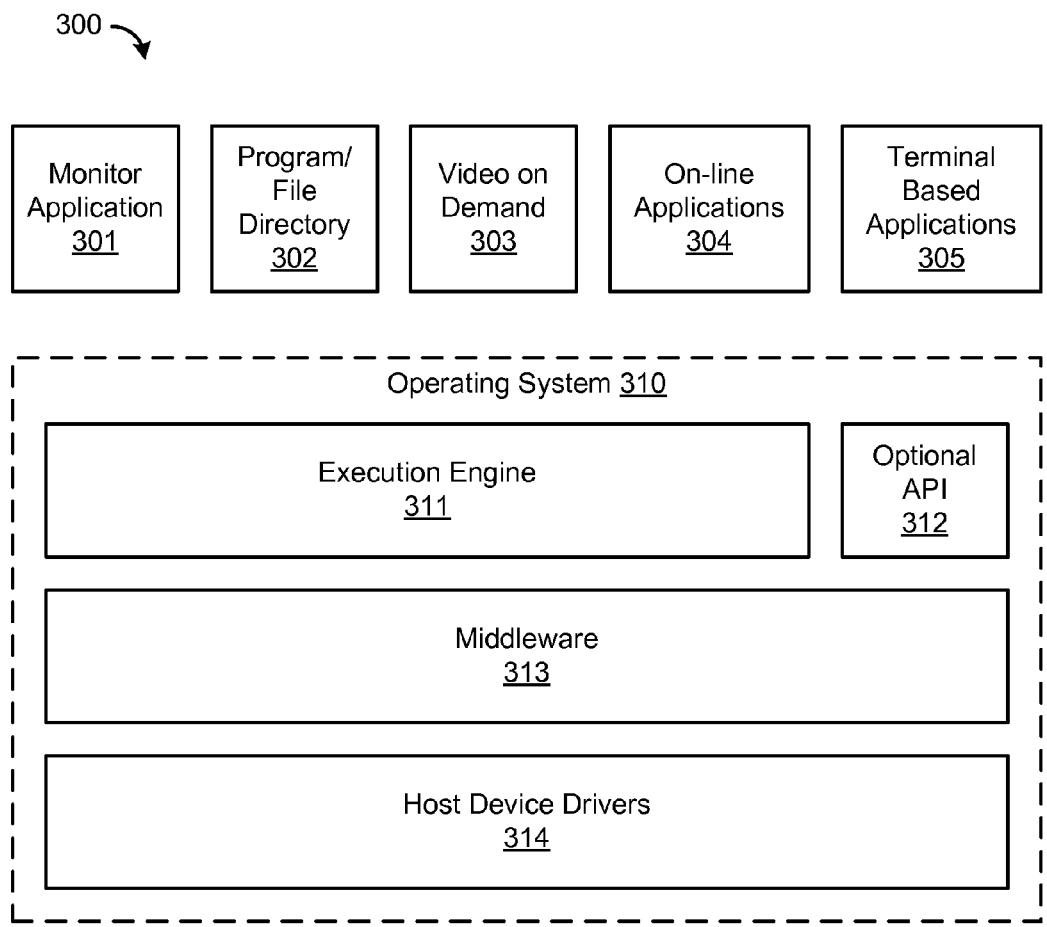
FIG. 3 is a block diagram illustrating inputs, outputs, and operations of an exemplary software architecture for a host system, according to some embodiments.

FIG. 3 is a block diagram illustrating an exemplary software architecture 300 for the host system 101. The software architecture 300 includes a monitor application 301 to receive either accelerometer and magnetometer measurements or acceleration-corrected attitude measurements from the multi-dimensional pointing device 200, depending on whether the multi-dimensional pointing device 200 or the host system processes the measurements so as to produce acceleration-corrected attitude measurements. The software architecture also includes a program/file directory 302 (e.g., an electronic program guide, etc.) that includes information about programs and/or media files (e.g., titles, times, channels, etc.), a video-on-demand application 303 that provides access to one or more video-on-demand services, online applications 304 that provide access to applications provided by a service provider (e.g., cable/satellite television providers, Internet service providers, Internet websites, game providers, online multimedia providers, etc.), and terminal based applications 305 that are (or that provide access to) applications that are resident on the host system 101 (e.g., games that are played on the host system, Internet browsing applications, multimedia viewing and/or sharing applications, email applications, etc.). In some embodiments, the multi-dimensional pointing device 200 includes a subset of these applications. Furthermore, the multi-dimensional pointing device 200 may include additional applications, modules and data structures not described above.

The software architecture 300 also includes an operating system (e.g., OpenCable Application Platform (OCAP), Windows, Linux, etc.) 310, which includes an execution engine (or virtual machine) 311 that executes applications, an optional API 312 for communicating with a multi-dimensional pointer that does not conform to a human interface standard implemented in the operating system 310, middleware 313 that provides management of the resources of the host system 101 (e.g., allocation of memory, access to access hardware, etc.) and services that connect software components and/or applications, respectively, and host device drivers 314. In some embodiments, the host device drivers 314 adjust the gain of the multi-dimensional pointing device 102 based on the resolution and/or aspect ratio of the display of the host system 101, translates physical movement of the multi-dimensional pointing device 102 to movement of a cursor (or an object) within the user interface of the host system 101, allows host applications to adjust cursor movement sensitivity, and/or reports hardware errors (e.g., a battery low condition, etc.) to the middleware 313.

In some embodiments, the multi-dimensional pointing device 102 periodically samples its sensors. The multi-dimensional pointing device 102 may also periodically provide the sampled sensor data to the host system 101 at a respective update rate. To reduce power consumption caused by transmitting data to the host system 101, the update rate may be set at a substantially smaller rate than the sampling rate. Note that the minimum update rate may be governed by the frame rate of the display of the host system (e.g., 25 Hz in Europe and 30 Hz in the United States and Asia). Note that there may be no perceivable advantage in providing faster updates than the frame rate except when the transmission media is lossy.

In some embodiments, the multi-dimensional pointing device 102 uses digital signal processing techniques. Thus, the sampling rate must be set high enough to avoid aliasing errors. Movements typically occur at or below 10 Hz, but AC power can create ambient magnetic field fluctuations at 50-60 Hz that can be picked up by a magnetometer. For example, to make sure there is sufficient attenuation above 10 Hz, the multi-dimensional pointing device 102 may use a 100 Hz sampling rate and a 50 Hz update rate.

In some embodiments, the multi-dimensional pointing device 102 reports raw acceleration and magnetic field measurements to the host system 101. In these embodiments, the host device drivers 314 calculate lateral and/or angular displacements based on the measurements. The lateral and/or angular displacements are then translated to cursor movements based on the size and/or the resolution of the display of the host system 101. In some embodiments, the host device drivers 314 use a discrete representation of angular displacement to perform sampling rate conversion to smoothly convert from the physical resolution of the multi-dimensional pointing device 102 (e.g., the resolution of the accelerometers and/or the magnetometers) to the resolution of the display.

In some embodiments, the host device drivers 314 interpret a sequence of movements (e.g., changes in attitude, displacements, etc.) as a gesture. For example, the user 103 may use the multi-dimensional pointing device 102 to move a cursor in a user interface of the host system 101 so that the cursor points to a dial on the display of the host system 101. The user 103 can then select the dial (e.g., by pressing a button on the multi-dimensional pointing device 102) and turn the multi-dimensional pointing device 102 clockwise or counter-clockwise (e.g., roll) to activate a virtual knob that changes the brightness, contrast, volume, etc., of a television set. Thus, users may use a combination or sequence of keypad presses and pointing device movements to convey commands to the host system. Similarly, the user 103 may use a twist of a wrist to select the corner of a selected image (or video) for sizing purposes. Note that the corner of an image may be close to another active object. Thus, selecting the image may require careful manipulation of the multi-dimensional pointing device 102 and could be a tiresome exercise. In these cases, using a roll movement as a context sensitive select button may reduce the accuracy users need to maintain with the movement of the multi-dimensional pointing device 102.

In some embodiments, the multi-dimensional pointing device 102 computes the physical displacement of the device and transmits the physical displacement of the device to the host system 101. The host device drivers 314 interpret the displacement as cursor movements and/or gestures. Thus, the host device drivers 314 can be periodically updated with new gestures and/or commands to improve user experience without having to update the firmware in the multi-dimensional pointing device 102.

In some other embodiments, the multi-dimensional pointing device 102 computes the physical displacement of the device and interprets the displacements as cursor movements and/or gestures. The determined cursor movements and/or gestures are then transmitted to the host system 101.

In some embodiments, the multi-dimensional pointing device 102 reports its physical spatial (e.g., lateral and/or angular) displacements based on a fixed spatial resolution to the host system 101. The host device drivers 314 interpret the distance and/or angle traversed into appropriate cursor movements based on the size of the display and/or the resolution of the display. These calculated displacements are then translated into cursor movements in the user interface of the host system 101.

Although the multi-dimensional pointing device 102 may provide data (e.g., position/displacement information, raw measurements, etc.) to the host system 101 at a rate greater than the frame rate of a display of the host system 101, the host device drivers 314 needs to be robust enough to accommodate situations where packet transmission fails. In some embodiments, each packet received from the multi-dimensional pointing device 102 is time stamped so that the host device drivers 314 can extrapolate or interpolate missing data. This time stamp information may also be used for gesture recognition to compensate for a lossy transmission media.

In some embodiments, the multi-dimensional pointing device 102 omits packets to conserve power and/or bandwidth. In some embodiments, the multi-dimensional pointing device 102 omits packets to conserve power and/or bandwidth only if it is determined that the host device drivers 314 can recreate the lost packets with minimal error. For example, the multi-dimensional pointing device 102 may determine that packets may be omitted if the same extrapolation algorithm is running on the host system 101 and on the multi-dimensional pointing device 102. In these cases, the multi-dimensional pointing device 102 may compare the real coordinates against the extrapolated coordinates and omit the transmission of specified packets of data if the extrapolated coordinates and the real coordinates are substantially similar.

In some embodiments, the multi-dimensional pointing device 102 includes a plurality of buttons. The plurality of buttons allows users that prefer a conventional user interface (e.g., arrow keys, etc.) to continue using the conventional user interface. In these embodiments, the host device drivers 314 may need to interpret a combination of these buttons as a single event to be conveyed to the middleware 313 of the host system.

In some embodiments, the host device drivers 314 are configured so that the multi-dimensional pointing device 102 appears as a two-dimensional pointing device (e.g., mouse, trackpad, trackball, etc.).

Figure 4:
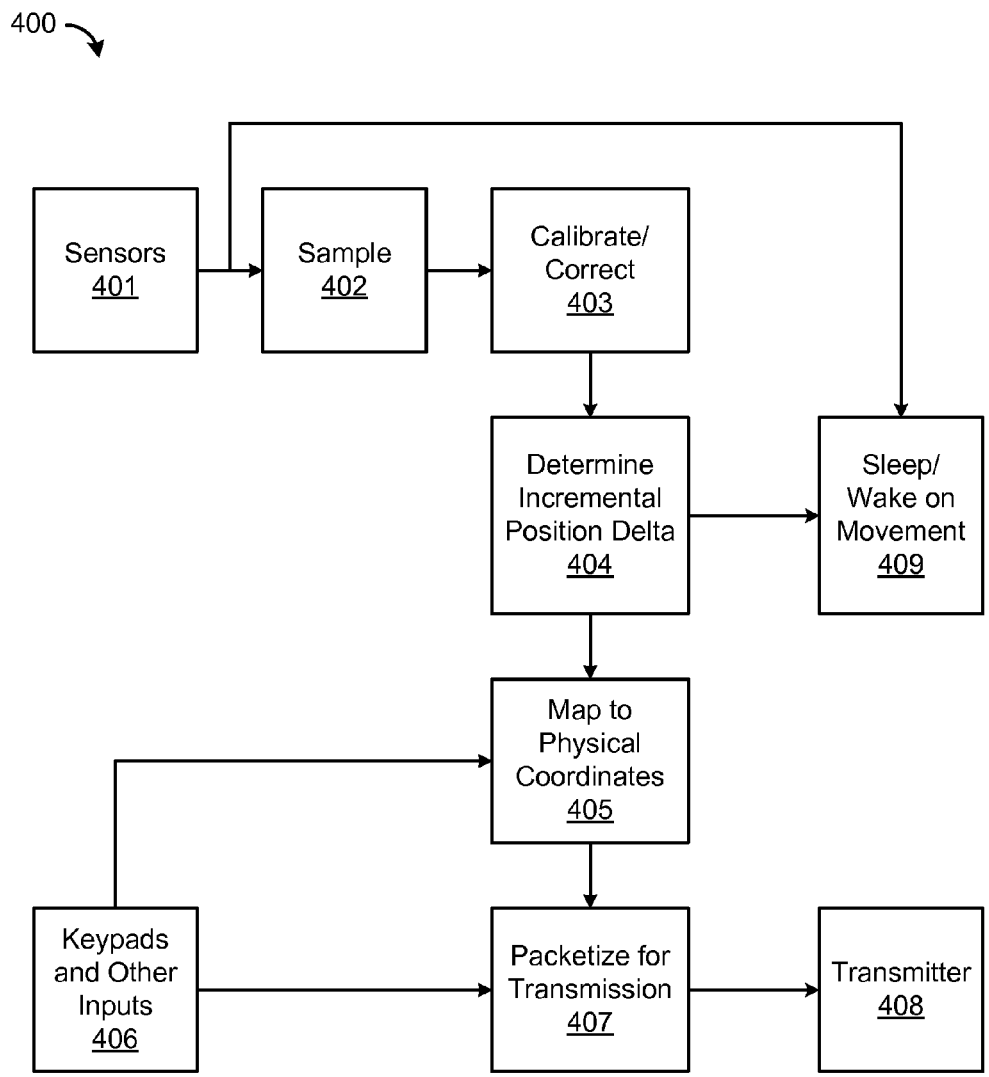
FIG. 4 is a block diagram illustrating an exemplary device-side firmware for a multi-dimensional pointing device, according to some embodiments.

FIG. 4 is a block diagram illustrating inputs, outputs, and operations of an exemplary device-side firmware 400 for the multi-dimensional pointing device 102, according to some embodiments. Sensors 401 generate measurement that may be sampled by one or more sampling circuits 402.

In some embodiments, the sampled sensor measurements are packetized for transmission 407 and transmitted to the host system 101 by a transmitter 408.

In some embodiments, the sampled sensor measurements are calibrated and corrected 403 (e.g., corrected for dynamic acceleration). The incremental change in position and/or attitude is determined 404. The determined incremental change in position and/or attitude is then mapped to physical coordinates 405 and packetized for transmission 407 by the transmitter 408. Keypad and other inputs 406 may also be packetized for transmission 407 and transmitted by the transmitter 408. In some embodiments, the keypad and/or other inputs 406 are used in conjunction movements of the multi-dimensional pointing device 102 to produce gestures that convey commands to a host system. In some of these embodiments, the keypad and other inputs 406 are mapped to physical coordinates 405 (e.g., noting the physical coordinates at which the keypad and other inputs were activated) prior to being packetized for transmission 407. Alternately, the time ordered sequence in which keypad presses (or other inputs) and changes in position of the multi-dimensional pointing device 102 are packetized and transmitted to the host system is used by the device to determine the context of the keypad presses (or other inputs) and to determine what gesture(s) were performed by the user.

The measurements from the sensors and the determined change in position and/or attitude may also be used to enter and/or exit sleep and wake-on-movement modes 409.

In some embodiments, the multi-dimensional pointing device 102 measures rotations of the remote over a physical space that is independent of the size, distance and direction of the display of the host system 101. In fact, the multi-dimensional pointing device 102 may report only displacements between two consecutive samples in time. Thus, the orientation of the multi-dimensional pointing device 102 does not matter. For example, yaw may be mapped to left/right cursor movement and pitch may be mapped to up/down cursor movements.

In some embodiments, to conserve system power, the multi-dimensional pointing device 102 detects a lack of movement of the multi-dimensional pointing device 102 and puts itself into a low power (e.g., sleep) mode. In some embodiments, a single accelerometer is used to sense whether the multi-dimensional pointing device 102 is being moved and to generate an interrupt to wake (e.g., wake-on-demand) the multi-dimensional pointing device 102 from the sleep mode.

In some embodiments, the multi-dimensional pointing device 102 determines that it should enter a sleep mode based on one or more of the following conditions: the magnitude of the acceleration measurement (e.g., $A_{observed}$) is not greater or smaller than the magnitude of Earth's gravity (e.g., G) by a specified threshold, the standard deviation of $A_{observed}$ does not exceed a specified threshold, and/or there is an absence of change in the angular relationship between the measurement of the Earth's magnetic field (e.g., B) and $A_{observed}$ greater than a specified threshold. Each of the aforementioned conditions may be used to indicate that the multi-dimensional pointing device 102 has entered a resting state (e.g., no substantial movement). After the multi-dimensional pointing device 102 has remained in a resting state for a specified number of consecutive samples, the multi-dimensional pointing device 102 enters a sleep mode.

In some embodiments, the device-side firmware 400 of the multi-dimensional pointing device 102 is updated by a host system 101 via a wireless interface.

Some embodiments provide one or more games and/or demo applications that demonstrate how to use the multi-dimensional pointing device (e.g., movement, controlling objects in the user interface, gestures, etc.).

Calculating Attitude During Dynamic Acceleration

Figure 5:
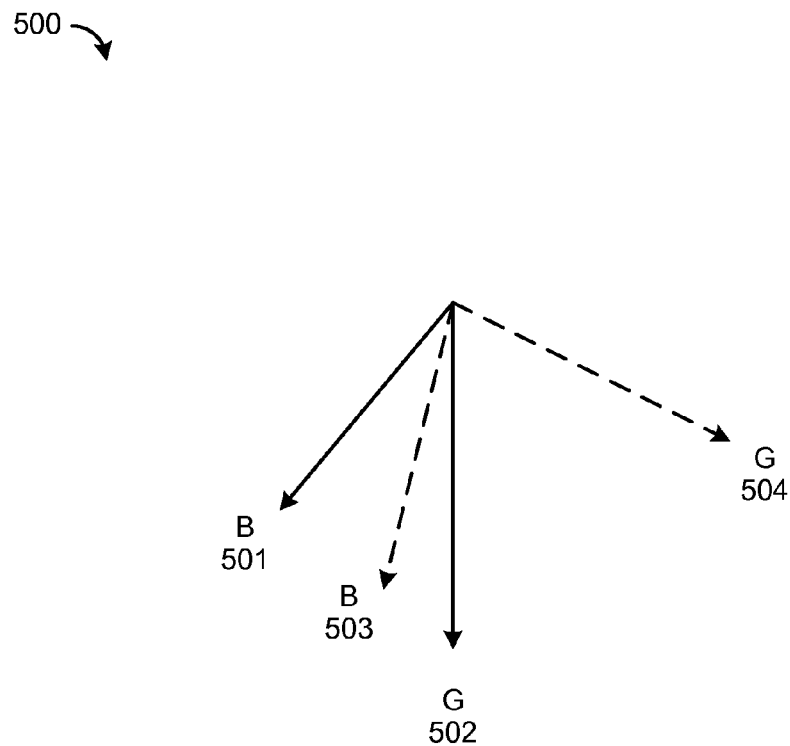
FIG. 5 is a diagram illustrating exemplary gravity and magnetic field vectors that can be used to determine attitude, according to some embodiments.

FIG. 5 is a diagram 500 illustrating exemplary gravity (G) and magnetic field (B) vectors that can be used to determine attitude, according to some embodiments. In some embodiments, G and B correspond to the Earth's gravity and the Earth's magnetic field, respectively. The Earth's magnetic field and gravity are assumed to form two stationary vectors. Using a magnetometer and an accelerometer, B and G may be measured. For example, the magnetic field vector B 501 and acceleration vector G 502 may be measured. When the multi-dimensional pointing device 102 is rotated, and then held stationary, B and G are measured again. In particular, the magnetic field vector B 503 and the acceleration vector G 504 may be measured. Given an unchanging relationship between B and G, the rotational operation that rotates B 501 and G 502 to B 503 and G 504, respectively, can be calculated. This rotation operation is the relative attitude/heading change.

Before continuing with the discussion, it is instructive to define two terms: body frame and the Earth frame. The body frame is the coordinate system in which B and G are measured with respect to a fixed point on the multi-dimensional pointing device 102. The diagram 500 in FIG. 5 illustrates the effect of a rotation of the multi-dimensional pointing device 102 as observed from the body frame. As the multi-dimensional pointing device 102 is held with one end or point of the multi-dimensional pointing device 102 at a fixed position, rotation of the multi-dimensional pointing device 102 causes B and G to move with respect to the body frame.

The Earth frame is the coordinate system in which B and G are measured with respect to a fixed point on the surface of the Earth. The Earth frame is typically the frame of reference for the user 103 of the multi-dimensional pointing device 102. When the user 103 moves the multi-dimensional pointing device 102, the user 103 typically thinks about the motion relative to the Earth frame.

Thus, the solution to the attitude of the multi-dimensional pointing device 102 can be formulated as follows: given two measurements of two constant vectors taken with respect to a body frame (of the multi-dimensional pointing device 102) that has undergone a rotation, solve for the rotation of the multi-dimensional pointing device 102 in the Earth frame.

There are a number of techniques can determine the attitude of the multi-dimensional pointing device 102. As discussed above, TRIAD is one such technique. Note that the following calculations may be formulated using Quaternion-based arithmetic to avoid issues with singularity associated with the TRIAD technique. The TRIAD technique operates as follows.

Given $w_1$ and $w_2$, which represent measurements (observations) of the B and G vectors in the body frame, the following are defined:

$$r_1 = \frac{w_1}{|w_1|} \qquad (1)$$

$$r_2 = \frac{r_1 \times w_2}{|r_1 \times w_2|} \qquad (2)$$

$$r_3 = r_1 \times r_2 \qquad (3)$$

where, $r_1$ is the normalized column vector $w_1$, $r_2$ is a normalized column vector orthogonal to $r_1$ and $w_2$, and $r_3$ is a normalized column vector orthogonal to $r_1$ and $r_2$.

Correspondingly, B and G are also known in the Earth frame. However these measurements are known a-priori; that is, they do not need to be measured and may be calculated from well-known theoretical models of the earth. For example, the magnitude and direction of the earth's magnetic and gravitational fields in San Jose, Calif. can be calculated without making new measurements. Thus the measurements in the body frame may be compared relative to these known vectors. If we call the vectors representing B and G in the Earth frame $v_1$ and $v_2$, then we may define:

$$s_1 = \frac{v_1}{|v_1|} \qquad (4)$$

$$s_2 = \frac{s_1 \times v_2}{|s_1 \times v_2|} \qquad (5)$$

$$s_3 = s_1 \times s_2 \qquad (6)$$

where $s_1$ is the normalized column vector $v_1$, $s_2$ is a normalized column vector orthogonal to $s_1$ and $v_2$, and $s_3$ is a normalized column vector orthogonal to $s_1$ and $s_2$.

Using the normalized column vectors defined above, the attitude matrix (A) that gives the rotational transform (i.e., for generating an uncorrected attitude of the multi-dimensional pointing device 200) in the Earth frame is:

$$A = R \cdot S^T \qquad (7)$$

where $R=[r_1|r_2|r_3]$ (e.g., a matrix comprised of the three column vectors $r_1$, $r_2$, and $r_3$), $S=[s_1|s_2|s_3]$ (e.g., a matrix comprised of the three column vectors $s_1$, $s_2$, and $s_3$), and the "T" superscript denotes the transpose of the matrix to which it is applied.

Applying to the problem at hand, if $v_1$ and $v_2$ are given as the B and G vectors in the Earth frame and $w_1$ and $w_2$ are inferred from measurements produced by the multi-dimensional accelerometers 201-202 and the magnetometer 203, the TRIAD technique may be used to compute the uncorrected attitude A of the multi-dimensional pointing device 102.

Figure 6:
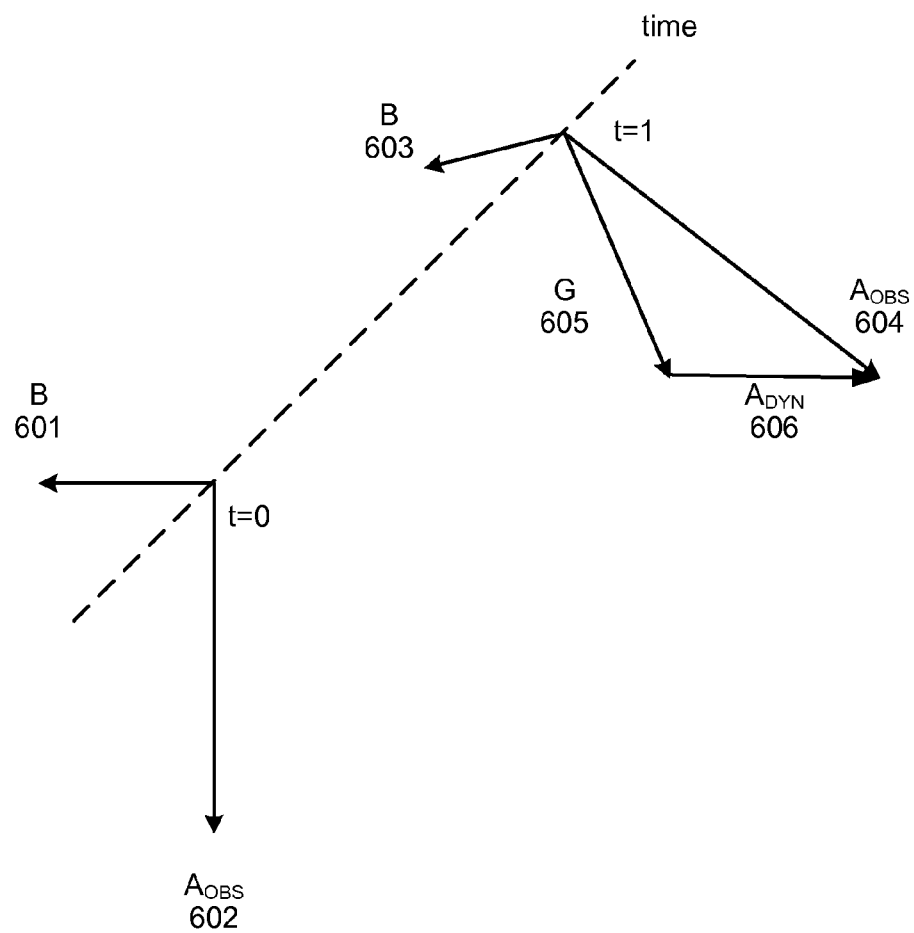
FIG. 6 is a diagram illustrating an attitude determination error caused at least in part by dynamic acceleration, according to some embodiments.

As discussed above, the accuracy of the relative heading/attitude of the multi-dimensional pointing device 102 determined by the TRIAD technique is predicated on the assumption that the device is not subject to dynamic acceleration. This assumption does not hold true in multi-dimensional pointing applications, in which the user 103 makes continuous movements and/or gestures with the multi-dimensional pointing device 102. FIG. 6 is a diagram 600 illustrating an attitude determination error caused at least in part by dynamic acceleration. At t=0, an acceleration measurement $A_{OBS}$ 602 (i.e., Earth's gravity G) and a magnetic field measurement B 601 are measured. As the multi-dimensional pointing device 102 is rotated at t=1, an acceleration $A_{DYN}$ 606 is induced on the multi-dimensional pointing device 102 so that the vector combination of Earth's gravity G 605 and $A_{DYN}$ 606 produce an acceleration measurement $A_{OBS}$ 604 in the body frame. Thus, the acceleration measurement $A_{OBS}$ 604 does not measure G 605. Instead, it includes the error induced by $A_{DYN}$ 606. Note that a magnetic field measurement B 603 is also measured in the body frame at t=1. Accordingly, an attitude calculation using $A_{OBS}$ 604 and B 603 would include error due to the dynamic acceleration. Thus, the TRIAD technique introduces an error to the computed attitude proportionate to the size of $A_{DYN}$ 606.

Figure 7:
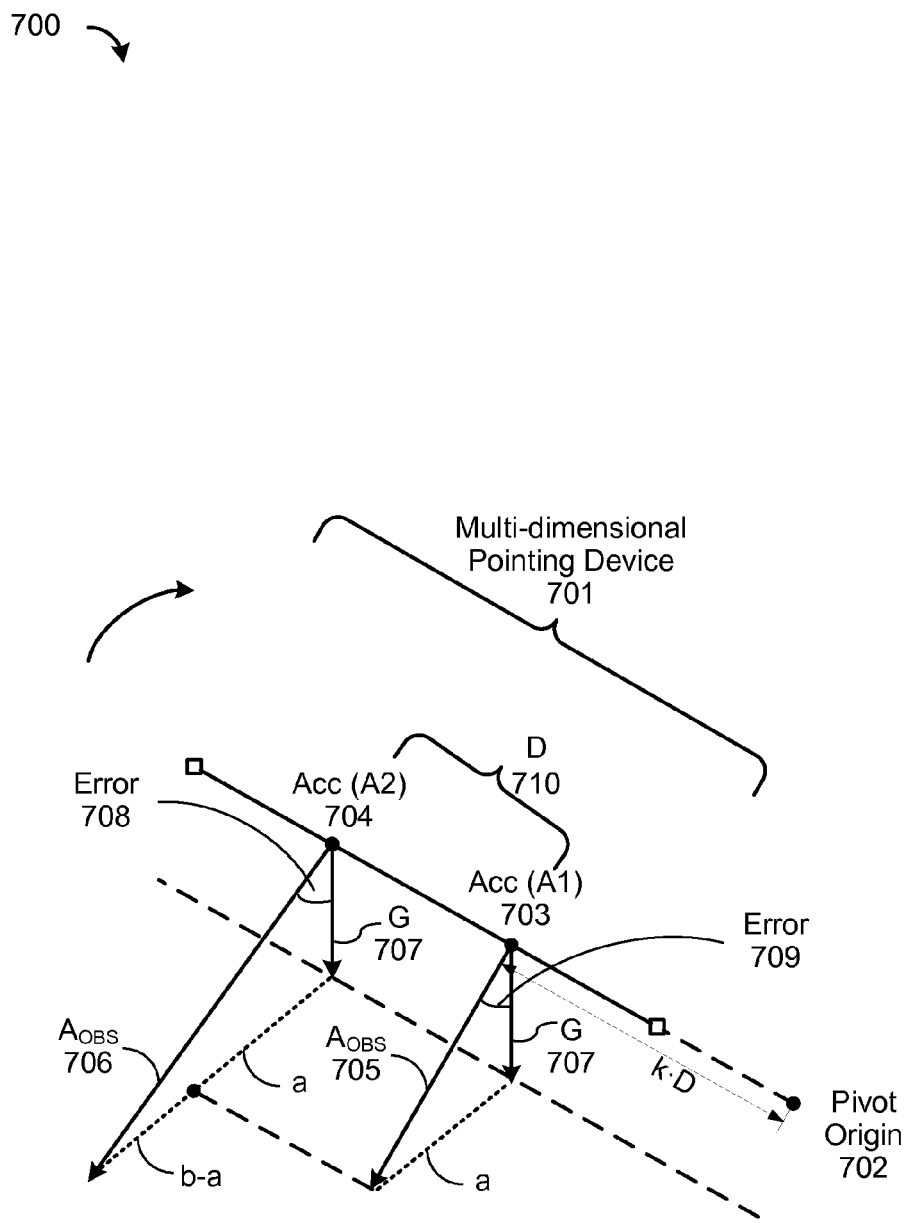
FIG. 7 is a diagram illustrating an exemplary technique for compensating for dynamic acceleration in attitude calculations, according to some embodiments.

In order to solve the aforementioned problems, some embodiments include two or more accelerometers to measure the dynamic acceleration that the multi-dimensional pointing device 102 experiences. FIG. 7 is a diagram 700 illustrating an exemplary technique for compensating for dynamic acceleration in attitude calculations of a multi-dimensional pointing device 701, according to some embodiments. The multi-dimensional pointing device 701 may be any one of the multi-dimensional pointing devices 102 and 200 in FIGS. 1 and 2, respectively. The multi-dimensional pointing device 701 includes multi-dimensional accelerometers 703 (A1) and 704 (A2) separated by a distance D 710. Furthermore, the distance from a pivot origin 702 to the first accelerometer A1 is equal to k·D, or k times the distance D between the two accelerometers A2 and A1, where k is a positive value. Thus, k is equal to the ratio of the distance between 1) A1 and the pivot origin 702, and 2) D, the distance between the two accelerometers. When the multi-dimensional pointing device 701 is a handheld remote control device having a length (maximum dimension) of six to ten inches, the pivot origin 702 is near one end of the device for wrist movements of the user. Assuming a value of D=3 inches, k would typically equal about 1 for wrist movements. For movements of the remote control in which the pivot origin 702 is in the user's elbow, the pivot origin is typically six to twelve inches outside the multi-dimensional pointing device 701, yielding a value k between 3 and 5 when D is equal to 3 inches. For movements of the remote control in which the pivot origin 702 is in the user's shoulder, the pivot origin is typically twelve to thirty inches outside the multi-dimensional pointing device 701, yielding a value k between 5 and 11 when D is equal to 3 inches.

Dynamic acceleration experienced the multi-dimensional pointing device 701 may include translational acceleration imparted by lateral movement of the multi-dimensional pointing device 701 and rotational acceleration. When the multi-dimensional pointing device 701 is affected by translational acceleration, both multi-dimensional accelerometers 703-704 experience the same dynamic acceleration. When the device is affected by angular acceleration, the multi-dimensional accelerometers 703-704 experience dynamic acceleration proportional to their distance from the pivot origin 702.

For example, consider the case when the multi-dimensional pointing device 701 is pivoted about the pivot origin 702, causing the multi-dimensional accelerometers 703 and 704 to produce composite acceleration measurements $A_{OBS}$ 705 and $A_{OBS}$ 706. The composite acceleration measurement $A_{OBS}$ 705 is a vector sum of the acceleration caused by Earth's gravity (G 707) and the dynamic acceleration a experienced by the first multi-dimensional accelerometer 703 (A1). The composite acceleration measurement $A_{OBS}$ 706 is a vector sum of the acceleration caused by Earth's gravity (G 707) and the dynamic acceleration b experienced by the second multi-dimensional accelerometer 704 (A2). Note that since the multi-dimensional accelerometer 704 is farther from the pivot origin 702 than the multi-dimensional accelerometer 703, the acceleration due to the rotation about the pivot origin 702 is greater at the second multi-dimensional accelerometer 704 (A2) than at the first multi-dimensional accelerometer 703 (A1). $A_{OBS}$ 705 and $A_{OBS}$ 706 include errors 708 and 709, respectively.

The change in the attitude of the multi-dimensional pointing device 102 may be computed using measurements from both of the two multi-dimensional accelerometers 703-704. When the dynamic acceleration is entirely translational, the difference between the two computed attitudes is zero. In some embodiments, only rotational movement is translated into cursor movements. Thus, translational displacements do not result in translational cursor movement because purely translational movements do not affect yaw, pitch or roll.

However, when the dynamic acceleration includes rotational components, the difference between the two accelerometer measurements produced by the two multidimensional accelerometers 703-704 are used to create a correction factor. This correction factor is applied to the attitude measurement for one of the multidimensional accelerometers (e.g., accelerometer 704) to provide angular displacements (e.g., change in attitude) that are compensated for dynamic acceleration.

Figure 8:
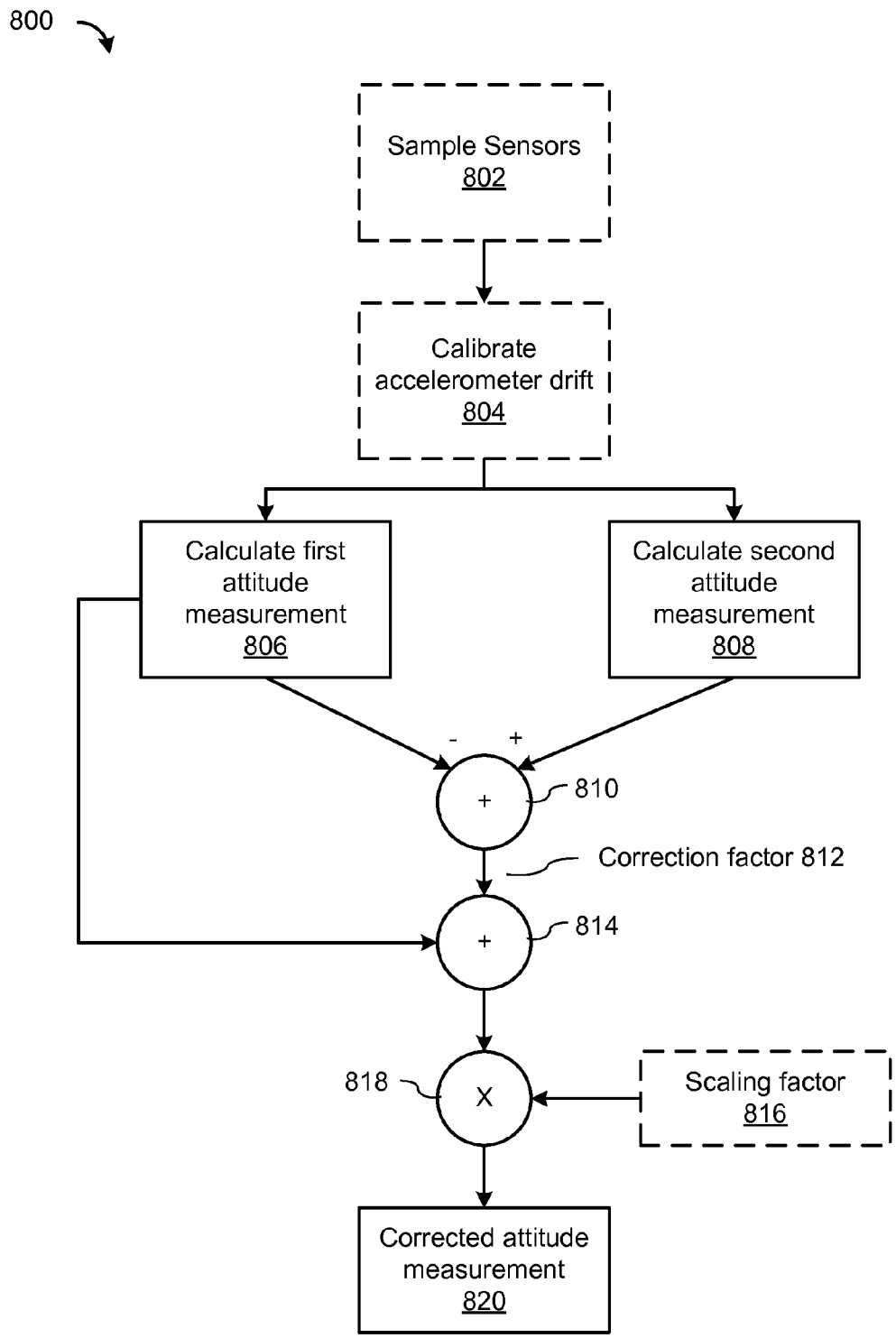
FIG. 8 is a block diagram illustrating an exemplary method for determining an attitude of a device undergoing dynamic acceleration, according to some embodiments.

FIG. 8 is a block diagram illustrating an exemplary method 800 for determining the attitude of a device (e.g., the multi-dimensional pointing devices 102, 200, and/or 701) undergoing dynamic acceleration, according to some embodiments. The method 800 begins when a first attitude measurement is calculated (806). In some embodiments, the first attitude measurement is calculated based on a first acceleration measurement (802) from a first multi-dimensional accelerometer and a magnetic field measurement from a multi-dimensional magnetometer. A second attitude measurement is calculated (808). In some embodiments, the second attitude measurement is calculated based on a second acceleration measurement (802) from a second multi-dimensional accelerometer and the magnetic field measurement from the multi-dimensional magnetometer.

The first attitude measurement is subtracted (810) from the second attitude measurement to produce a correction factor 812. This subtraction is typically implemented in rotation space, where the addition and subtract of rotation sequences is implemented by multiplications of transposed or untransposed matrices (or analogously for quaternions with the quaternion product). The correction factor 812 is added (814) back to the first attitude measurement to produce a corrected attitude measurement 820. As discussed below, the correction factor 812 may be implemented as a rotation matrix C (e.g., a 3 by 3 matrix), and the attitude measurements may be implemented as 3-element vectors. The first attitude measurement is multiplied by the correction factor matrix C in order to produce the corrected attitude measurement 820. The matrix multiplication operation adds a rotational correction to the first attitude measurement so as to remove or reduce error in the first attitude measurement caused by manual acceleration of the pointing device 701.

It is noted that the correction factor 812 is zero when the device is not undergoing dynamic acceleration. In other words, if the device is either at rest or in motion but not under acceleration, the correction factor 812 is zero. This is because the first and second attitude measurements are the same, or substantially the same (e.g., within a predefined threshold) between the device is not undergoing dynamic acceleration. In some embodiments, when the magnitude of the calculated correction factor 812 is less than a first predefined threshold, corresponding to a noise level associated with the accelerometers of the device, the correction factor 812 is set or reset to zero to avoid application of a correction factor when the device is, in fact, either not undergoing dynamic acceleration or is not undergoing measurable dynamic acceleration. Alternately, or in addition, when the acceleration is below a second predefined threshold, a smaller than standard gain is used to determine the amount of cursor movement (on a display device of a host system) corresponding to the movement of the device.

In some embodiments, a scaling factor 816, which is based on the distance k·D (see FIG. 7) of the first multi-dimensional accelerometer A1 to a pivot origin 702 and the distance (k+1)·D of the second multi-dimensional accelerometer A2 to the pivot origin, is multiplied with the sum of the correction factor 810 and the first attitude measurement to produce the corrected attitude measurement 820. For example, the scaling factor may be equal to k, which is the ratio of the distance between the first accelerometer A1 and the pivot origin 702 to the distance D between the first and second accelerometers. In some embodiments, the scaling factor k is estimated as a constant value for all gestures or movements of the multi-dimensional pointing device 701, while in some other embodiments the scaling factor k is variable, depending on observed dynamic acceleration of the multi-dimensional pointing device 701 over multiple measurement periods, which may be used to estimate the pivot origin 702 of the current movement as being in the user's wrist, elbow or shoulder.

In some embodiments, the aforementioned acceleration measurements, the magnetic field measurements, and the attitude measurements are represented as matrices. Accordingly, in these embodiments, the mathematical operations (e.g., 810, 814, 818) in the method 800 are matrix operations. For example, $$A_C = A_1 \cdot C(k) \tag{8}$$

where $A_1$ is a matrix representing the measured attitude (as a three-dimensional rotation from the Earth frame to the body frame) of the pointer device as determined by measurements at the first accelerometer A1 (703, FIG. 7), C(k) is a rotation matrix representing the correction factor 812 as a function of k, the scaling factor 816 which is determined by the distance ratio discussed above, and $A_C$ is a matrix representing the corrected attitude measurement 820 of the pointer device. C(k) represents a fractional rotation when k is unequal to 1. Furthermore, in some embodiments, C(k) is an S0(3) matrix, which means that the determinant of the matrix equals +1, and the rows or columns of the matrix are mutually orthogonal.

In some embodiments, the computed value of $A_C$ is a differential measurement, representing a change is the attitude of the pointer device since a prior measurement of the pointer device's attitude. In such embodiments, a new value of $A_C$ is computed for each successive epoch, where an epoch is the period of time between pointer device attitude updates. Typically, there will be at least twenty epochs per second (i.e., each epoch corresponding to a period of 0.05 seconds or less), and more typically 30 to 100 epochs per second (i.e., epochs corresponding to a period between 0.0333 and 0.01 seconds). Alternately, the rate of epochs corresponds to an update rate of a user interface in the host device (e.g., a epoch rate equal to 1× or 2× of the update rate of the user interface).

In some embodiments, prior to calculating the first and the second attitude measurements, the multi-dimensional accelerometers and magnetometers are sampled (802) and/or calibrated (804) (e.g., to correct for sensor drift).

Figure 9:
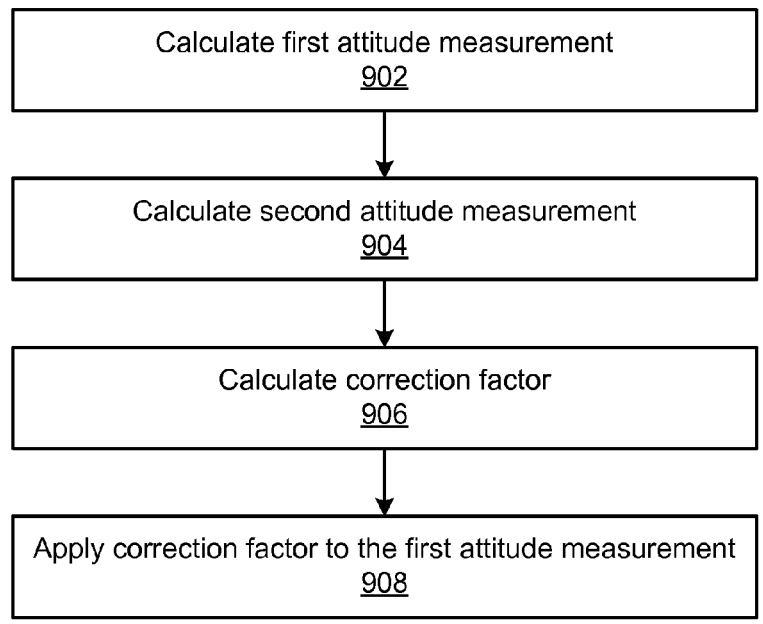
FIG. 9 is a flow diagram of a method for determining an attitude of a device undergoing dynamic acceleration, according to some embodiments.

FIG. 9 is a flow diagram of a method 900 for determining an attitude of a device (e.g., the multi-dimensional pointing devices 102, 200, and/or 701) undergoing dynamic acceleration, according to some embodiments. The method 900 begins when a first attitude measurement is calculated (902) based on a magnetic field measurement received from a magnetometer of the device and a first acceleration measurement received from a first accelerometer of the device. A second attitude measurement is calculated (904) based on the magnetic field measurement received from the magnetometer of the device and a second acceleration measurement received from a second accelerometer of the device. In some embodiments, the first attitude measurement and the second attitude measurement are performed substantially simultaneously.

A correction factor is then calculated (906) based at least in part on a difference of the first attitude measurement and the second attitude measurement. The correction factor is then applied (908) to the first attitude measurement to produce a corrected attitude measurement for the device. In some embodiments, the correction factor includes a scaling factor that is based at least in part on a distance from the first accelerometer and a pivot origin, and a distance from the second accelerometer and the pivot origin. A more detailed description of generating and applying the correction factor is provided above with reference to FIGS. 7 and 8.

In some embodiments, the corrected attitude measurement is transmitted from the device to a host system. In other embodiments, the magnetic field measurement, the first acceleration measurement, and the second acceleration measurement are transmitted from the device to a host system. From the viewpoint of the host system, the host system receives the magnetic field measurement, the first acceleration measurement, and the second acceleration measurement from the device.

In some embodiments, additional signals are transmitted from the device to a host system indicating that one or more buttons on the device have been pressed. From the viewpoint of the host system, the host system receives signals from the device indicating that one or more buttons of the device have been pressed.

In some embodiments, the device transmits to a host system signals indicating that a user of the device has performed one or more gestures.

In some embodiments, the corrected attitude measurement is used to position a cursor displayed on a user interface of a host system. In some embodiments, a gesture that is being performed by a user of the device is determined. The gesture may include a sequence of changes in attitude of the device over a contiguous period of time, or a combination of a sequence of changes in attitude of the device and one or more buttons being pressed on the device over a contiguous period of time. The gesture may correspond to a user command to the host system, wherein the determination of the gesture is based on one or more positions of the cursor in the user interface selected from the group consisting of a beginning position of the gesture occurring with the cursor positioned within a first predefined proximity of an object in the user interface, an end of the gesture occurring with the cursor positioned with a second predefined proximity of the object in the user interface, or both the beginning and end of the gesture occurring with the cursor positioned within the first and second proximities of the object, respectively. Other gestures may be determined, at least in part, based on proximity of the cursor to one object at a first time (e.g., beginning of the gesture) and proximity of the cursor to a second object or position at a second time (e.g., end of the gesture).

Figure 10:
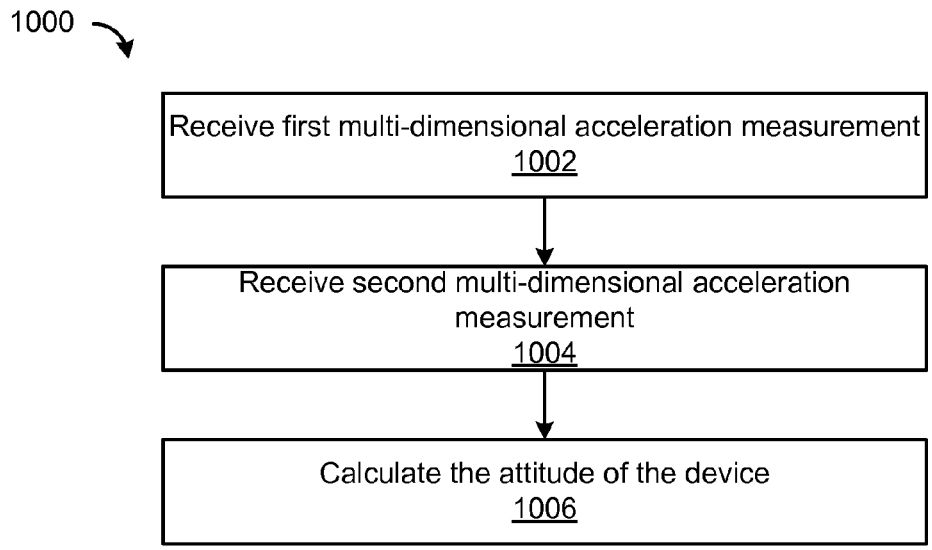
FIG. 10 is a flow diagram of another method for determining an attitude of a device undergoing dynamic acceleration, according to some embodiments.

FIG. 10 is a flow diagram of a method 1000 for determining an attitude of a device (e.g., the multi-dimensional pointing devices 102, 200, and/or 701) undergoing dynamic acceleration, according to some embodiments. The method 1000 begins when a first multi-dimensional acceleration measurement is received (1002) from a first accelerometer of the device. A second multi-dimensional acceleration measurement is received (1004) from a second accelerometer of the device, wherein the device includes two or more multi-dimensional accelerometers including at least the first accelerometer and the second accelerometer. In some embodiments, the first and the second multi-dimensional acceleration measurements are received at a host system. In some embodiments, the first and the second multi-dimensional acceleration measurements are received at the device.

The attitude of the device is calculated (1006) based on the first and the second acceleration measurements. In some embodiments, the host system calculates the attitude of the device, while in other embodiments the device calculates the attitude of the device.

In some embodiments, the method 1000 is performed during dynamic acceleration of the device. In these embodiments, a correction factor that substantially corrects for attitude determination errors caused by the dynamic acceleration is determined and applied to the calculated attitude measurements.

FIG. 11 is a flow diagram of a method 1100 for determining an attitude of a device (e.g., the multi-dimensional pointing devices 102, 200, and/or 701) undergoing dynamic acceleration, according to some embodiments. The method 1100 begins when a first multi-dimensional acceleration measurement is received (1102) from a first accelerometer of the device. A second multi-dimensional acceleration measurement is received (1104) from a second accelerometer of the device, wherein the device includes two or more multi-dimensional accelerometers including at least the first accelerometer and the second accelerometer. A first magnetic field measurement is received (1106) from a first magnetometer, wherein the device includes one or more magnetometers including at least the first magnetometer. In some embodiments, the first and the second multi-dimensional acceleration measurements and the magnetometer measurement are received at a host system, while in other embodiments the first and the second multi-dimensional acceleration measurements and the magnetometer measurement are received at the device.

The attitude of the device is then calculated (1108) based on the first and the second accelerometer measurements and the first magnetometer measurement. In some embodiments, the host system calculates the attitude of the device, while in other embodiments the device calculates the attitude of the device.

In some embodiments, the method 1100 is performed during dynamic acceleration of the device. In these embodiments, a correction factor that substantially corrects for attitude determination errors caused by the dynamic acceleration is determined. In some embodiments, the correction factor is based on at least the first and the second acceleration measurements. In some embodiments, the correction factor is also based on the separation distance between the first and the second accelerometers.

The methods 800-1100 may be governed by instructions that are stored in a computer readable storage medium and that are executed by one or more processors of a pointing device or a host system. As noted above, in some embodiments these methods may be performed in part on a pointing device and in part on a host system. Each of the operations shown in FIGS. 8-11 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

FIG. 12 is a block diagram of a multi-dimensional pointing device 1200. The multi-dimensional pointing device 1200 may be any one of the multi-dimensional pointing devices 102, 200, and 701. The multi-dimensional pointing device 1200 typically includes one or more processing units (CPU's) 1202, one or more network or other communications interfaces 1204 (e.g., a wireless communication interface, as described above with reference to FIG. 1), memory 1210, accelerometers 1270, and one or more communication buses 1209 for interconnecting these components. In some embodiments, communications interfaces 1204 include a transmitter 408 (FIG. 4) for transmitting information, such as accelerometer and magnetometer measurements, and/or the computed attitude of the multi-dimensional pointing device 1200, and/or other information to a host system (e.g., host system 101 or 1300). The communication buses 1209 may include circuitry (sometimes called a chipset) that interconnects and controls communications between system components. The multi-dimensional pointing device 1200 optionally may include a user interface 1205 comprising a display device 1206 (LCD display, LED display, etc.) and input devices 1207 (e.g., keypads, buttons, etc.). In some embodiments, the multi-dimensional pointing device 1200 includes one or more magnetometers 1272. Memory 1210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1210 may optionally include one or more storage devices remotely located from the CPU(s) 1202. Memory 1210, or alternately the non-volatile memory device(s) within memory 1210, comprises a computer readable storage medium. In some embodiments, memory 1210 stores the following programs, modules and data structures, or a subset thereof:

- an operating system 1212 that includes procedures for handling various basic system services and for performing hardware dependent tasks;
- a communication module 1213 that is used for connecting the multi-dimensional pointing device 1200 to a host system via the one or more communication (network) interfaces 1204 (wired or wireless); the communication module optionally may also be adapted for connecting the multi-dimensional pointing device 1200 to one or more communication networks, such as the Internet, other wide area networks, local area networks, metropolitan area networks, and so on;
- data representing accelerometer measurements 1214;
- data representing magnetometer measurements 1215;
- data representing button presses 1216;
- a user interface module 1218 that receives commands from the user via the input devices 1207 and generates user interface objects in the display device 1206;
- a gesture determination module 1219 that determines gestures based on a sequence of corrected attitude measurements, as described above;
- an attitude determination module 1220 that determines the attitude of the multi-dimensional pointing device 1200, as described above with respect to FIGS. 8-11, wherein the attitude determination module 1220 produces attitude measurements 1221 and/or corrected attitude measurements 1222;
- a correction factor determination module 1230 that determines a correction factor that substantially corrects for dynamic acceleration of the multi-dimensional pointing device 1200, as described above with respect to FIGS. 8-11, wherein the correction factor determination module 1230 produces a correction factor 1231; and
- a scaling factor determination module 1240 that determines a scaling factor that accounts for the distance of a first accelerometer from a pivot origin and the distance of the second accelerometer from the pivot origin, as described above with respect to FIGS. 7-8, wherein the scaling factor determination module 1240 produces a scaling factor 1241.

It is noted that in some of the embodiments described above, the multi-dimensional pointing device 1200 does not include a gesture determination module 1219, because gesture determination is performed by a host system, and a scaling factor determination module 1240, because the scaling factor may be a fixed (e.g., a constant value) in some implementation. In some other embodiments described above, the multi-dimensional pointing device 1200 also does not include an attitude determination module 1220 because the multi-dimensional pointing device 1200 transmits accelerometer and magnetometer measurements (and optionally button presses) to a host system at which the attitude of the pointing device is determined.

Each of the above identified elements may be stored in one or more of the previously mentioned memory devices, and each of the above identified programs or modules corresponds to a set of instructions for performing a function described above. The set of instructions can be executed by one or more processors (e.g., the CPUs 1202). The above identified modules or programs (i.e., sets of instructions) need not be implemented as separate software programs, procedures or modules, and thus various subsets of these modules may be combined or otherwise re-arranged in various embodiments. In some embodiments, memory 1210 may store a subset of the modules and data structures identified above. Furthermore, memory 1210 may store additional modules and data structures not described above.

Although FIG. 12 shows a "multi-dimensional pointing device," FIG. 12 is intended more as functional description of the various features which may be present in a pointing device. In practice, and as recognized by those of ordinary skill in the art, items shown separately could be combined and some items could be separated.

Figure 13:
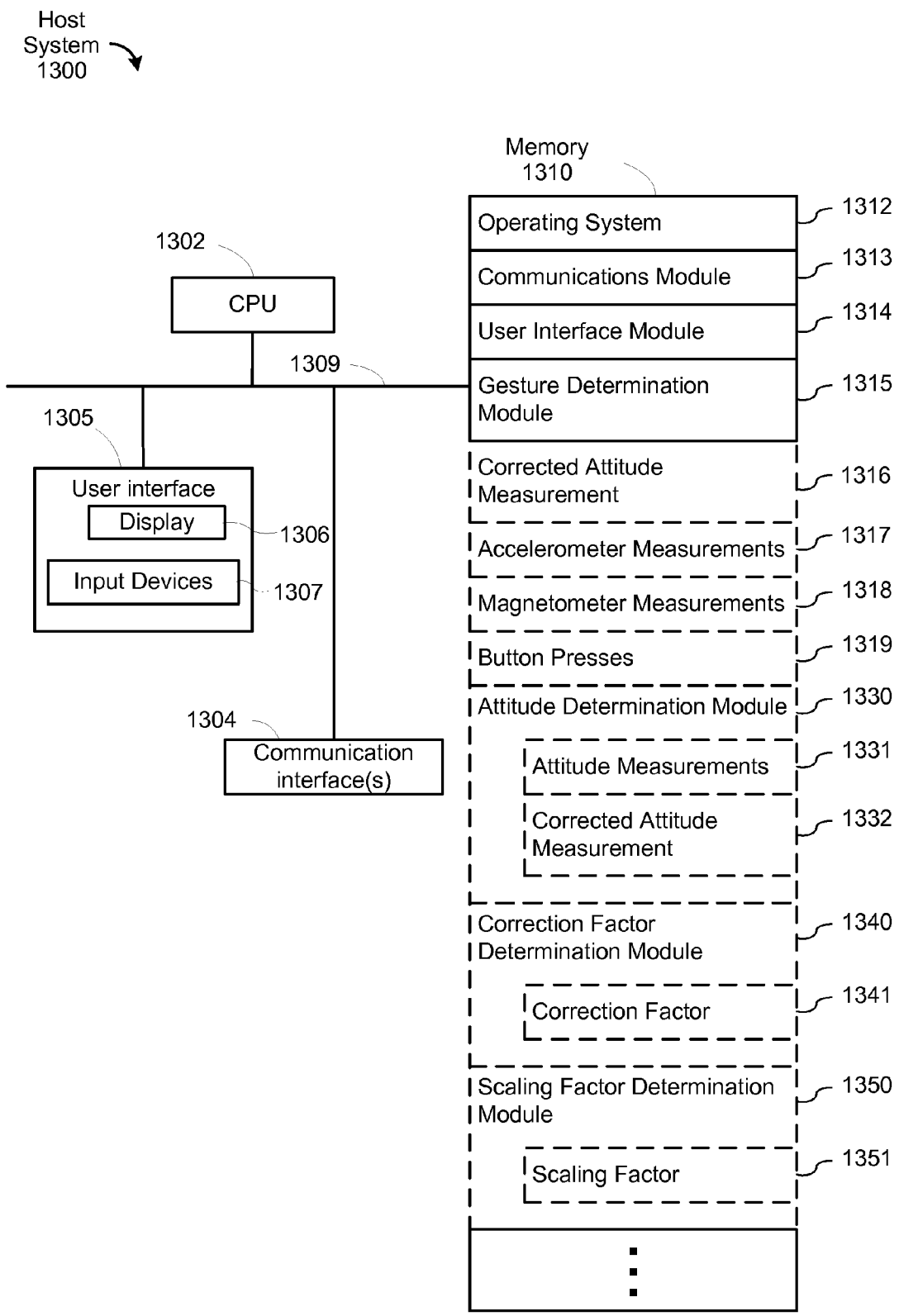
FIG. 13 presents a block diagram of an exemplary host system, according to some embodiments.

FIG. 13 is a block diagram of a host system 1300. The host system 1300 may be any one of the host systems 101, or software architecture 300 described above. The host system 1300 typically includes one or more processing units (CPU's) 1302, one or more network or other communications interfaces 1304 (e.g., any of the wireless interfaces described above with reference to FIG. 1), memory 1310, and one or more communication buses 1309 for interconnecting these components. In some embodiments, communications interfaces 1304 include a receiver for receiving information, such as accelerometer and magnetometer measurements, and/or the computed attitude of a multi-dimensional pointing device (e.g., device 102, 200, 400 or 1200), and/or other information from the multi-dimensional pointing device. The communication buses 1309 may include circuitry (sometimes called a chipset) that interconnects and controls communications between system components. The host system 1300 optionally may include a user interface 1305 comprising a display device 1306 (LCD display, LED display, etc.) and input devices 1307 (e.g., a multi-dimensional pointing device, mouse, keyboard, trackpad, trackball, keypads, buttons, etc.). Memory 1310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1310 may optionally include one or more storage devices remotely located from the CPU(s) 1302. Memory 1310, or alternately the non-volatile memory device(s) within memory 1310, comprises a computer readable storage medium. In some embodiments, memory 1310 stores the following programs, modules and data structures, or a subset thereof:

- an operating system 1312 that includes procedures for handling various basic system services and for performing hardware dependent tasks (e.g., the middleware 313 in FIG. 3);
- a communication module 1313 that is used for connecting host system 1300 to a multi-dimensional pointing device (e.g., point device 1200), and/or other devices or systems via the one or more communication (network) interfaces 1304 (wired or wireless), and for connecting host system 1300 to one or more communication networks, such as the Internet, other wide area networks, local area networks, metropolitan area networks, and so on;
- a user interface module 1314 that receives commands from the user via the input devices 1307 and generates user interface objects in the display device 1306;
- a gesture determination module 1315 that determines gestures based on a sequence of corrected attitude measurements for a pointing device, as described above;
- data representing a corrected attitude measurement 1316 that is received from a multi-dimensional pointing device;
- data representing accelerometer measurements 1317 received from a multi-dimensional positioning device and/or determined;
- data representing magnetometer measurements 1318 received from a multi-dimensional positioning device;
- data representing button presses 1319 received from a multi-dimensional positioning device;
- an attitude determination module 1330 that determines the attitude of a pointing device, as described above with respect to FIGS. 8-11, wherein the attitude determination module 1330 provides attitude measurements 1331 and/or corrected attitude measurements 1332;
- a correction factor determination module 1340 that determines a correction factor that substantially corrects for dynamic acceleration of a pointing device, as described above with respect to FIGS. 8-11, wherein the correction factor module determination module 1340 provides a correction factor 1341; and
- a scaling factor determination module 1350 that determines a scaling factor that accounts for the distance of a first accelerometer from a pivot origin and the distance of the second accelerometer from the pivot origin, as described above with respect to FIGS. 7-8, wherein the scaling factor determination module 1350 provides a scaling factor 1351.

It is noted that in some of the embodiments described above, the host system 1300 does not store data representing accelerometer measurements 1317 and data representing magnetometer measurements 1318, and also does not include an attitude determination module 1330, correction factor determination module 1340 and scaling factor determination module 1350 because the pointing device's accelerometer and magnetometer measurements are processed at the pointing device, which sends data representing a corrected attitude measurement 1316 to the host system 1300. In other embodiments, the pointing device sends data representing measurements to the host system 1300, in which case the modules for processing that data are present in the host system 1300.

Each of the above identified elements may be stored in one or more of the previously mentioned memory devices, and each of the above identified programs or modules corresponds to a set of instructions for performing a function described above. The set of instructions can be executed by one or more processors (e.g., the CPUs 1302). The above identified modules or programs (i.e., sets of instructions) need not be implemented as separate software programs, procedures or modules, and thus various subsets of these modules may be combined or otherwise re-arranged in various embodiments. The actual number of processors and software modules used to implement the host system 1300 and how features are allocated among them will vary from one implementation to another. In some embodiments, memory 1310 may store a subset of the modules and data structures identified above. Furthermore, memory 1310 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a respective computer system having one or more processors and memory storing one or more programs that when executed by the one or more processors cause the respective computer system to perform the method, the method comprising:
    obtaining a first acceleration measurement received from a first accelerometer of a device, wherein the first acceleration measurement corresponds to respective movement of the device;
    obtaining a second acceleration measurement received from a second accelerometer of the device, wherein the second acceleration measurement corresponds to the respective movement of the device and the first accelerometer is spaced apart from the second accelerometer in the device by an accelerometer offset distance;
    obtaining a pivot distance that corresponds to distance between the device and a pivot origin for the respective movement; and
    determining an attitude measurement for the device based on the first acceleration measurement, the second acceleration measurement, the pivot distance and the accelerometer offset distance.

2. The method of claim 1, wherein the first accelerometer and the second accelerometer are spaced apart from each other by the accelerometer offset distance on a rigid body.

3. The method of claim 1, including:
    determining a preliminary attitude of the device based on sensor measurements from a set of one or more sensors that includes the first accelerometer and the second accelerometer;
    calculating a correction factor that is based on the accelerometer offset distance and the pivot distance; and
    determining the attitude measurement based on the preliminary attitude of the device and the correction factor.

4. The method of claim 1, wherein the correction factor is the ratio of the accelerometer offset distance and the pivot distance.

5. The method of claim 1, wherein obtaining the pivot distance includes:
    determining a pivot origin based on sensor measurements obtained during a plurality of measurement epochs; and
    determining the pivot distance based on the pivot origin.

6. The method of claim 5, wherein determining the pivot origin includes determining whether movement of the device corresponds to movement of a user's wrist, movement of the user's elbow, or movement of the user's shoulder.

7. The method of claim 1, wherein the first accelerometer is selected from the group consisting of:
    a 2-axis accelerometer that measures a magnitude and a direction of an acceleration force in two dimensions; and
    a 3-axis accelerometer that measures a magnitude and a direction of an acceleration force in three dimensions.

8. The method of claim 7, wherein the second accelerometer is selected from the group consisting of:
    a 2-axis accelerometer that measures a magnitude and a direction of an acceleration force in two dimensions; and
    a 3-axis accelerometer that measures a magnitude and a direction of an acceleration force in three dimensions.

9. A computer system comprising:
    one or more processors;
    memory; and
    one or more programs, wherein the one or more programs are stored in the memory and configured to be executed by the one or more processors, the one or more programs comprising instructions to:
    obtaining a first acceleration measurement received from a first accelerometer of a device, wherein the first acceleration measurement corresponds to respective movement of the device;
    obtaining a second acceleration measurement received from a second accelerometer of the device, wherein the second acceleration measurement corresponds to the respective movement of the device and the first accelerometer is spaced apart from the second accelerometer in the device by an accelerometer offset distance;
    obtaining a pivot distance that corresponds to distance between the device and a pivot origin for the respective movement; and
    determining an attitude measurement for the device based on the first acceleration measurement, the second acceleration measurement, the pivot distance and the accelerometer offset distance.

10. The computer system of claim 9, wherein the first accelerometer and the second accelerometer are spaced apart from each other by the accelerometer offset distance on a rigid body.

11. The computer system of claim 9, including instructions for:
    determining a preliminary attitude of the device based on sensor measurements from a set of one or more sensors that includes the first accelerometer and the second accelerometer;
    calculating a correction factor that is based on the accelerometer offset distance and the pivot distance; and
    determining the attitude measurement based on the preliminary attitude of the device and the correction factor.

12. The computer system of claim 9, wherein the correction factor is the ratio of the accelerometer offset distance and the pivot distance.

13. The computer system of claim 9, wherein obtaining the pivot distance includes:
    determining a pivot origin based on sensor measurements obtained during a plurality of measurement epochs; and
    determining the pivot distance based on the pivot origin.

14. The computer system of claim 13, wherein determining the pivot origin includes determining whether movement of the device corresponds to movement of a user's wrist, movement of the user's elbow, or movement of the user's shoulder.

15. A non-transitory computer readable storage medium storing one or more programs configured for execution by one or more processors of a computer system, the one or more programs comprising instructions to:
- obtain a first acceleration measurement received from a first accelerometer of a device, wherein the first acceleration measurement corresponds to respective movement of the device;
- obtain a second acceleration measurement received from a second accelerometer of the device, wherein the second acceleration measurement corresponds to the respective movement of the device and the first accelerometer is spaced apart from the second accelerometer in the device by an accelerometer offset distance;
- obtain a pivot distance that corresponds to distance between the device and a pivot origin for the respective movement; and
- determine an attitude measurement for the device based on the first acceleration measurement, the second acceleration measurement, the pivot distance and the accelerometer offset distance.

16. The non-transitory computer readable storage medium of claim 15, wherein the first accelerometer and the second accelerometer are spaced apart from each other by the accelerometer offset distance on a rigid body.

17. The non-transitory computer readable storage medium of claim 15, including instructions which, when executed, cause the computer system to:
- determine a preliminary attitude of the device based on sensor measurements from a set of one or more sensors that includes the first accelerometer and the second accelerometer;
- calculate a correction factor that is based on the accelerometer offset distance and the pivot distance; and
- determine the attitude measurement based on the preliminary attitude of the device and the correction factor.

18. The non-transitory computer readable storage medium of claim 15, wherein the correction factor is the ratio of the accelerometer offset distance and the pivot distance.

19. The non-transitory computer readable storage medium of claim 15, wherein obtaining the pivot distance includes:
- determining a pivot origin based on sensor measurements obtained during a plurality of measurement epochs; and
- determining the pivot distance based on the pivot origin.

20. The non-transitory computer readable storage medium of claim 19, wherein determining the pivot origin includes determining whether movement of the device corresponds to movement of a user's wrist, movement of the user's elbow, or movement of the user's shoulder.

* * * * *